United States Patent [19]

Gyugyi et al.

[11] Patent Number: 4,581,696
[45] Date of Patent: Apr. 8, 1986

[54] CONTROL METHOD AND APPARATUS FOR A UFC FOR MINIMIZING INPUT CURRENT DISTORTIONS

[75] Inventors: Laszlo Gyugyi, Penn Hills; Theodore M. Heinrich, Murrysville, both of Pa.; Gyu-Hyeong Cho, Seoul, Rep. of Korea

[73] Assignee: Westinghouse Electric Corp., Pittsburgh, Pa.

[21] Appl. No.: 596,330

[22] Filed: Apr. 3, 1984

[51] Int. Cl.$^4$ .......................................... H02M 5/257
[52] U.S. Cl. .................................. 363/161; 318/810; 363/165
[58] Field of Search ..................... 318/808, 810, 811; 363/8, 10, 41, 44, 47, 160, 164, 165, 161, 162

[56] References Cited

U.S. PATENT DOCUMENTS

| | | | |
|---|---|---|---|
| 3,470,447 | 9/1969 | Gyugyi et al. | 363/10 |
| 3,493,838 | 2/1970 | Gyugyi et al. | 363/10 |
| 3,967,173 | 6/1976 | Stich | 363/41 |
| 4,047,083 | 9/1977 | Plunkett | 363/41 |
| 4,195,334 | 3/1980 | Perry et al. | 363/44 |
| 4,337,429 | 6/1982 | Stuart | 363/41 |
| 4,488,216 | 12/1984 | Gyugyi et al. | 363/160 |

OTHER PUBLICATIONS

Gyugyi et al., "Static Power Frequency Changers", pp. 5–14 and 363–383, John Wiley & Son, 1976.

Primary Examiner—William H. Beha, Jr.
Assistant Examiner—Jeffrey Sterrett
Attorney, Agent, or Firm—C. M. Lorin

[57] ABSTRACT

In a pulse-width modulated unrestricted frequency changer (UFC) the harmonic contents of the input current are minimized by splitting the active time intervals within the fundamental time frame into at least two pulses which are located within such time frame and controlled in width as if individual PWM single-pulse UFC's were controlled having a phase shift between each other so as to eliminate or reduce undesired frequency components. Such elimination or minimization of selected frequency components is used to reduce the size of the lowpass filter at the input of the UFC, namely by allowing a higher cut-off resonance limit.

17 Claims, 46 Drawing Figures

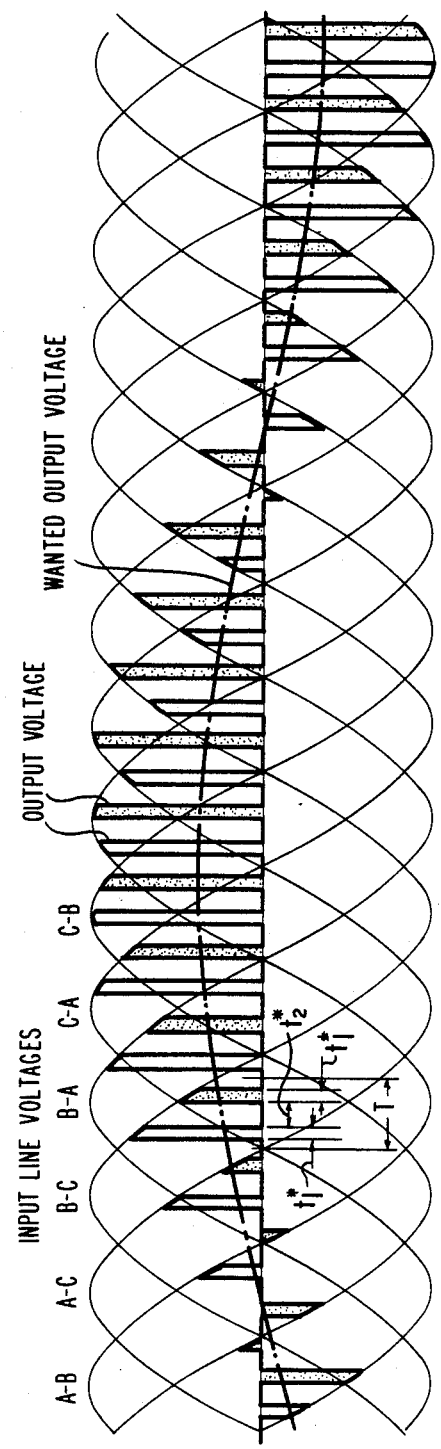

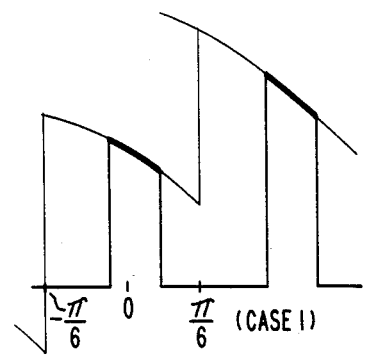
FIG. 12A (CASE 1)
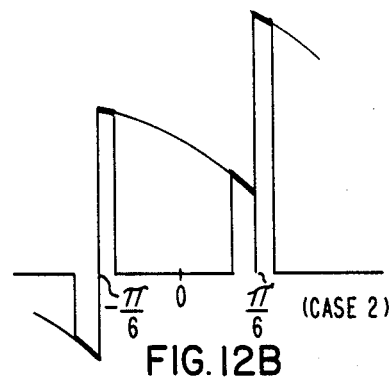
FIG. 12B (CASE 2)
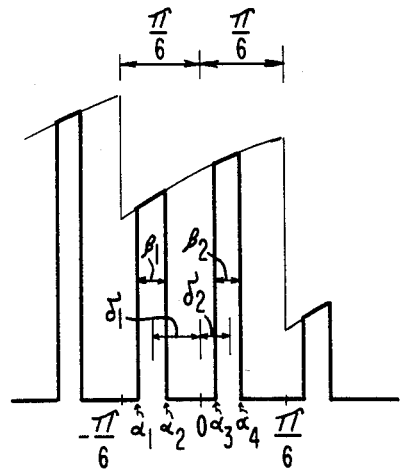
FIG. 15A (TYPE A)
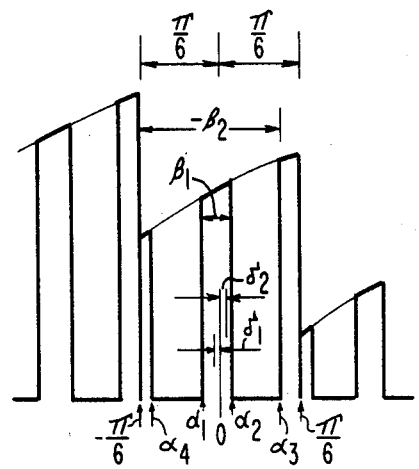
FIG. 15B (TYPE B)
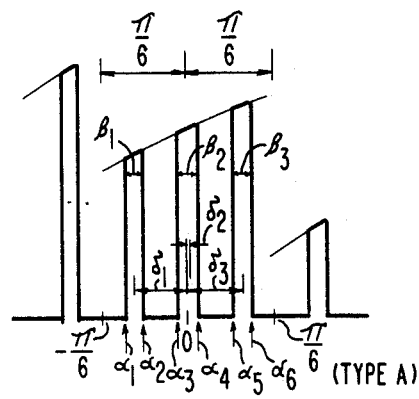
FIG. 15C (TYPE A)
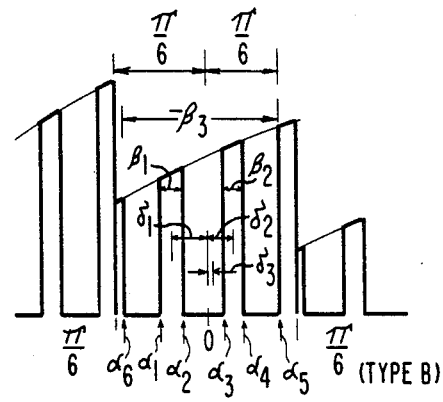
FIG. 15D (TYPE B)

SECOND ORDER LOWPASS FILTER
TRANSFER FUNCTION

CONTROL METHOD AND APPARATUS FOR A UFC FOR MINIMIZING INPUT CURRENT DISTORTIONS

BACKGROUND OF THE INVENTION

The invention relates to static power frequency changers in general, and more particularly to Unrestricted Frequency Changers (UFC) and their applications, for instance to adjustable speed AC motor drives.

The Unrestricted Frequency Changer (UFC) and its adjunct static switch control for the generation of an AC wave of controlled voltage and frequency have been described in U.S. Pat. Nos. 3,470,447 and 3,493,838 of L. Gyugyi et al. These patents show how the switches in each of the static converters associated with an output phase of the load can be selectively and cyclically controlled for conduction during a predetermined time interval so as to derive and output power defined by a controlled increment of the input voltage, itself delineated between two time intervals are used for shorting the output, which process results in an AC output voltage having a frequency depending upon the repetition rate of the conduction time intervals and a magnitude measured by the time period of effective conduction of each static switch. Such an unrestricted frequency changer is advantageously applied in variable speed AC drives as explained on pages 5-14, and 363-383 of "Static Power Frequency Changers" by L. Gyugyi and B. R. Pelly, published by John Wiley & Sons 1976. In this regard, for instance, Gyugyi and Pelly have observed that the UFC has an inherent bilateral characteristic between the powe source at its input and the power supply at its output, which allows a four-quadrant operation of the motor drive without costly additional circuitry.

The unrestricted frequency changer technique has become particularly attractive with the advent of modern bilateral switches, for instance, power transistors, and GTO devices.

When used for controlling the speed of an AC motor, the Unrestricted Frequency Changer requires a voltage source type termination at the input terminals. This is due to the fact that the AC motor represents an inductive load at the output. Since the UFC connects the multi-phase input source sequentially to such inductive load (thus, load current), the input source must provide low impedance path for the step-like current wave drawn by the UFC. The voltage source type termination in practice is normally provided by a low pass LC input filter in such a way that the input terminals of the UFC are shunted by capacitors. This type of filter, viewed from the input terminals of the UFC, constitutes a parallel connected LC circuit, which provides a low impedance for the high frequency (harmonic) components present in the step-like UFC input current wave at frequencies higher than the resonant frequency of the circuit. Thus, the basic criterion for the design of the filter is to ensure that its resonant frequency (or "cut-off" frequency) is lower than the lowest input harmonic frequency (corresponding to the minimum output frequency) so as to avoid resonant amplification of the input current harmonics. This criterion often necessitates a relatively large and expensive input filter.

The Unrestricted Frequency Changer (UFC) is an AC-to-AC converter. In addition to the fundamental current, extrabasal currents are generated by the UFC flow through the input power line. Therefore, a properly designed input filter is essential to the pulse-width modulated UFC-induction motor drive system. A method of filter design is known for a double pulse-width modulated 6-pulse UFC. The most difficult problem in the filter design, though, is that the low frequency extrabasal components, where $\omega_I$ is the angular input frequency and $\omega_O$ is the angular output frequency, namely the $(5\omega_I+6\omega_O)$ and $(7\omega_I+6\omega_O)$ components, in the case of a 6-pulse UFC, are hard to eliminate. By increasing the modulation frequency, the magnitudes of these two low frequency components can be lowered to some extent. However, they still remain no matter how high the modulation frequency can be increased. Another method of reducing the total rms extrabasal current is to modulate each of the three UFC converters individually so that between the output phases the control pulses are "interlaced", so as to minimize the overlap among neighboring pulses on the input side. This is the approach disclosed in concurrently filed copending patent application Ser. No. 06/596,329.

A preferable method would be to eliminate both the $(5\omega_I+6\omega_O)$ and the $(7\omega_I+6\omega_O)$ components, in a 6-pulse UFC situation. Although a specific example that it is possible does exist, it is not conceivable, at this time, that those two extrabasal components can be always eliminated for the whole range of the output voltage.

Assuming for the sake of discussion that elimination of only one of the two components, instead of two, in the UFC is possible, it will be either the $(5\omega_I+6\omega_O)$ component, or the $(7\omega_I+6\omega_O)$ component. Furthermore, if it is assumed that the relative amplitudes of those two components is being controlled, it becomes conceivable, then, to increase the cut-off frequency of the low-pass filter substantially thereby to reduce the filter size and the VAR rating considerably. In other words, it is possible to avoid, or at least mitigate, the effect of the filter resonance by controlling the extrabasal components which are near to the cut-off frequency of the filter. Nevertheless, when reducing one component, the amplitude of the other component is generally increased. In conclusion, this leaves still open the requirement of a total harmonic minimization method for a given filter characteristic.

SUMMARY OF THE INVENTION

It is the object of the present invention to provide an approach toward optimization by which the input rms extrabasal current is minimized. Data are calculated, using a computer for several kinds of filter parameters and under particular UFC modulations.

Thus, the present invention pertains to a method and apparatus for controlling the output voltage of the UFC so as to ensure that the input current harmonics in a selected frequency range, in which the input filter exhibits a high impedance (resonance), remain minimal. This allows the resonant frequency of the input filter to be higher than the lowest input harmonic frequency. As a consequence, the size and cost of the input filter can be greatly reduced without significantly impairing the distortion of the current drawn from the AC input source.

The present invention resides in controlling the bilateral switches of an Unrestricted Frequency Changer (UFC), each switch upon its turn, within the switching cycle of the output phase so as to repeatedly and alternatively perform elementary conduction subintervals (t*) and succeeding shorting sub-time intervals a predetermined n number of times with each switch and at distributed instants which in contrast to U.S. Pat. No. 4,488,216, are "unequally" spaced within the time period T of operation of the particular bilateral switch, the shorting time intervals being varied in relation to the output frequency in such a way that the amplitudes of the harmonic components, present in the output voltage and input current waveforms of a frequency that would be at, or close to, the resonant frequency of the input filter, will be minimized.

Such control of the bilateral switches is accomplished digitally. The allocation of elementary conduction time intervals to each bilateral switch and their distribution throughout the time period thereof are performed in accordance with a model which is taking into account the intended frequency and voltage at the output.

Digital techniques are used in order:

(1) to maintain a constant ratio between output voltage and frequency for constant airgap flux when applied to an induction motor;

(2) to provide substantially the same voltage increment as in a UFC of the prior art while selecting and allocating with unequal distribution within the time period T a number of elementary time intervals of conduction per bilateral switch which equates with (t*) one time interval of conduction in the prior art, within the switching cycle per phase of the AC output wave.

BRIEF DESCRIPTION OF THE DRAWINGS

FIG. 11 shows the UFC output voltage waveform for two conduction subintervals;

FIGS. 12A and 12B illustrate with curves single pulse-width modulation of a 6-pulse UFC system in cases #1 and #2, respectively;

FIG. 15A is the double-pulse modulation situation when M=2 (two-pulse) in type A;

FIG. 15B is like FIG. 15A but in type B;

FIGS. 15C and 15D are like FIGS. 15A and 15B but for M=3 (three-pulse) in types A and B, respectively.

DETAILED DESCRIPTION OF THE INVENTION

Figure 1:
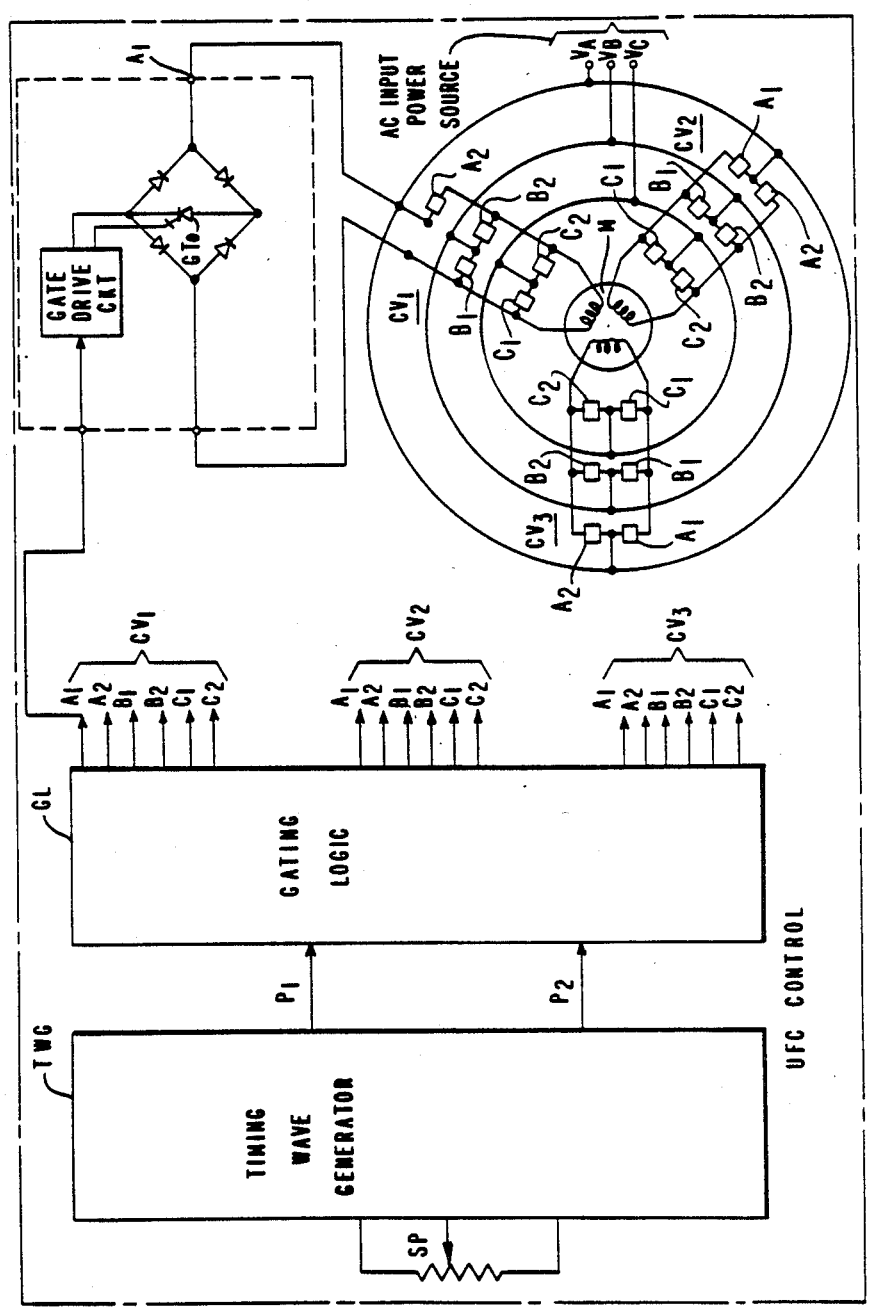
FIG. 1 is a block diagram of an UFC motor drive system according to aforementioned U.S. Pat. Nos. 3,470,447, and 3,493,838.

For the purpose of illustration the invention will be described as part of an AC drive system. It is understood, however, that the Unrestricted Frequency Changer (UFC) according to the invention can be used in a variety of industrial and other applications.

In the AC drive system of the preferred embodiment of the invention an Unrestricted Frequency Changer (UFC) is used to provide variable frequency-variable voltage output power to control the speed of an AC induction motor. In keeping with the volt-per-hertz characteristic of the induction motor, the fundamental output voltage is varied essentially in proportion with the output frequency. Such variation of the output voltage had been achieved up to now by simple pulse-width variation technique. This prior art approach resulted in increased motor current harmonics and the occurrence of increased ripple in the input supply current at relatively low motor speeds. A new voltage control method is now proposed which minimizes the input supply and motor current ripples over the total speed (output frequency) range. This results in significant improvement in motor performance at low speeds and economic benefits by reducing the input filtering requirements and motor losses.

The Unrestricted Frequency Changer (UFC) described in U.S. Pat. Nos. 3,470,447 and 3,493,836 as static "artificially" commutated frequency converters with variable output voltage is well known in the literature, and this prior art type of converter will be hereinafter designated as the UFC.

When compared to other static power converters, the UFC has significant advantages that make it particularly suitable for providing variable frequency electric power to control the speed of AC motors. These advantages can be listed as follows:

1. Single stage power conversion with bidirectional power flow (i.e., power can flow either to or from the load). This permits regenerative braking of the motor.

2. A wide output frequency range, which is not limited by the input (supply) frequency. That is, the generated output frequency can be lower, higher, and equal to the input frequency.

3. The frequency spectrum of the output waveform is independent of the amplitude of the wanted fundamental component. Furthermore, the frequencies of the "unwanted" (harmonic) components in the output waveform are widely separated from the fundamental frequency over the total output frequency range. This separation of the harmonic frequencies from the fundamental increases "naturally" (i.e., without changing the method of output voltage waveform construction) as the fundamental output frequency decreases. Thus the frequencies of the harmonic currents in the motor remain high relative to the fundamental, even at low speeds. Therefore the motor runs without cogging.

4. The output voltages of a three-phase converter are inherently in balance. Nevertheless, individual control of the three output voltages is possible.

5. The lagging (inductive) motor displacement power factor results in leading (capacitive) displacement power factor (with equal phase angle) at the AC supply. Therefore, unity output (load) displacement power factor is reflected back to the AC supply without change.

6. Control is simple, that is, the output frequency and voltage can be controlled as shown in the Gyugyi et al patents by two appropriately displaced pulse trains, both having the same even rate.

However, the Unrestricted Frequency Changer has the disadvantage that with the prior art method of voltage control described in the above-mentioned U.S. Patents, the amplitudes of the harmonic components in the output voltage, and those in the input current drawn from the AC power supply, increase appreciably as the fundamental output voltage is decreased. This results in increased losses in the machine at low speeds, and it may necessitate considerable filtering in the input supply lines. A method is now proposed, according to the present invention, by which the amplitude of the fundamental output voltage is controlled while maintaining an essentially constant amplitude ratio between the dominant harmonics and the fundamental voltage and current at the output and input terminals of the UFC as the output voltage is varied from maximum to zero.

The Unrestricted Frequency Changer (UFC) motor drive system described in the aforementioned U.S. Patents, is illustrated schematically in FIG. 1. It consists of three identical bidirectional converter power circuits, $CV_1$, $CV_2$, $CV_3$, supplying the three stator windings $W_1$, $W_2$, $W_3$, of an induction motor M, a gating logic GL generating the electrical signals necessary to turn ON and OFF the bilateral switching units ($A_1$, $A_2$, $B_1$, $B_2$, $C_1$, $C_2$) in each of the converters $CV_1$, $CV_2$, $CV_3$. A timing wave generator TWG is provided outputting two pulse trains $P_1$, $P_2$ in response to external analog signals which determine through a setpoint SP the output frequency $f_O$ and voltage $V_O$ applied to the motor. The relationship between the two control pulse trains $P_1$, $P_2$ and the output voltage $V_O$ of the UFC is illustrated by the waveforms (a), (b), (c) shown in FIG. 2. As seen by (a), pulse train $P_1$ determines the output frequency and in accordance with (b) pulse train $P_2$ determines the amplitude $V_O$ of the fundamental output voltge. The two pulse trains are so coordinated that the output voltage $V_O$ increases with increasing output frequency $f_O$ so as to maintain an essentially constant air-gap flux in the motor. FIG. 1 illustrates gating by the gating logic circuit GL of the gate drive circuit of switching unit $A_1$ within converter $CV_1$, switching unit $A_1$ having a GTO device mounted for bilateral operation. Switching unit $A_1$ is illustrative of the other switching units $A_2$, $B_1$, $B_2$, $C_1$ and $C_2$.

Figure 2:
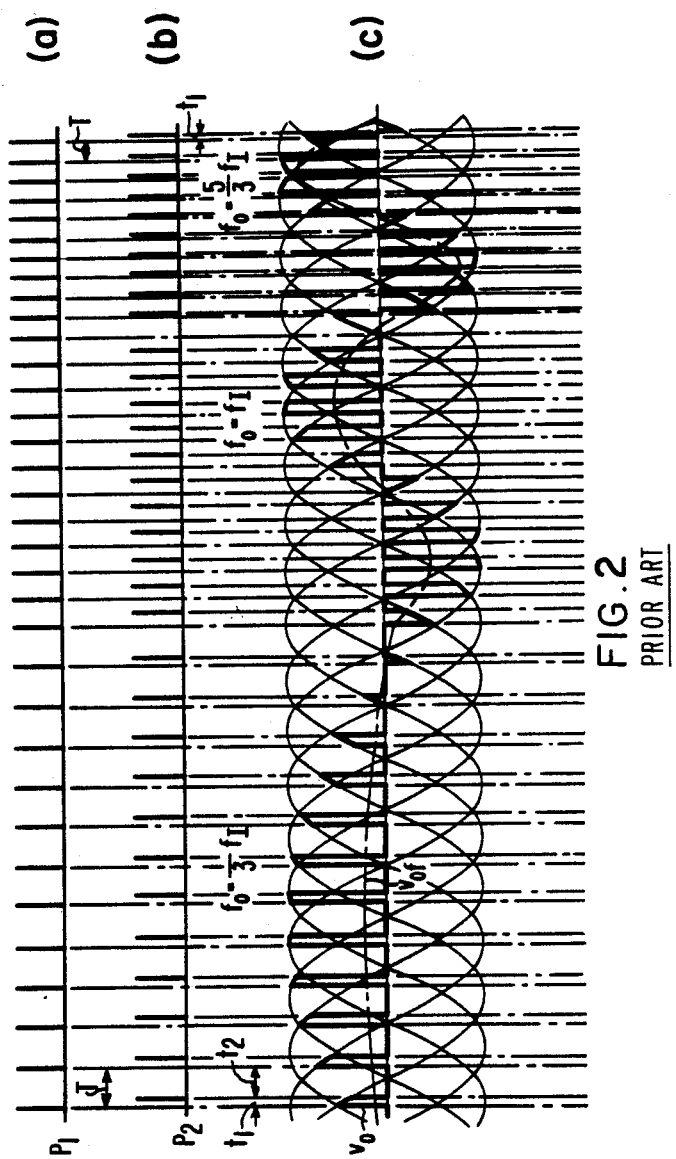
FIG. 2 is a chart illustrating with curves the effect of three different repetition rates and spacings of the control pulse trains P1, P2 of the system of FIG. 1 upon the output frequency and voltage and upon the output current.

It appears from curve (c) of FIG. 2, that between two consecutive pulses $P_1$, $P_2$ a segment of one of the input voltage waves provided by the input AC power source is connected to the output of the converter by the gated bilateral switches ($A_1$, $A_2$, $B_1$, $B_2$, . . . or $C_2$). Between two consecutive pulses $P_2$ and $P_1$, the output of the converter is shorted by the bilateral switches. Such successive "segments of voltage" are derived from the input and applied to the output according to a definite conduction pattern which involves six consecutive different bilateral switches such as $A_1$ shown in the example of FIG. 1. Such successive "segments of voltage" are building up an alternating output voltage $V_O$ with an essentially sinusoidal envelope, as shown, for different output frequencies $f_O = \frac{1}{3}f_I$, $f_O = f_I$ and $f_O = 5/3f_I$, by curve (c) of FIG. 2. The average of the "voltage segments" caused by conduction of a bilateral switch ($A_1$, $A_2$, $B_1$ . . . $C_2$) between two successive pulses $P_1$, $P_2$ (shown on FIG. 2 under (a) and (b), respectively) varies essentially sinusoidally over the output cycle as illustrated by the dotted line under (c) in FIG. 2. The motor current $i_O$ due to the converter output voltage $V_{Of}$ as shown in FIG. 2 under (c) is illustrated in FIG. 2 by curve (d). The dotted line there shows the fundamental component $i_{Of}$ of the motor current $i_O$.

The switching pattern depends upon the time interval between two consecutive pulses $P_1$, $P_2$ as well as upon the repetition rate of the two trains of pulses. In order to maintain a constant air-gap flux in the motor, when the frequency $f_O$ increases (increased repetition rate of $P_1$, $P_2$) the voltage $V_O$ is automatically increased by spacing more $P_1$ and $P_2$ from one another, thereby increasing the width of each "voltage segment". This is shown in FIG. 2 under (a), (b) and (c) for three instances of output frequency: $f_O = \frac{1}{3}f_I$, $f_O = f_I$ and $f_O = 5/3f_I$, where $f_I$ is the frequency of the input AC power source supplying the three converters $CV_1$, $CV_2$, $CV_3$.

Figure 3A:
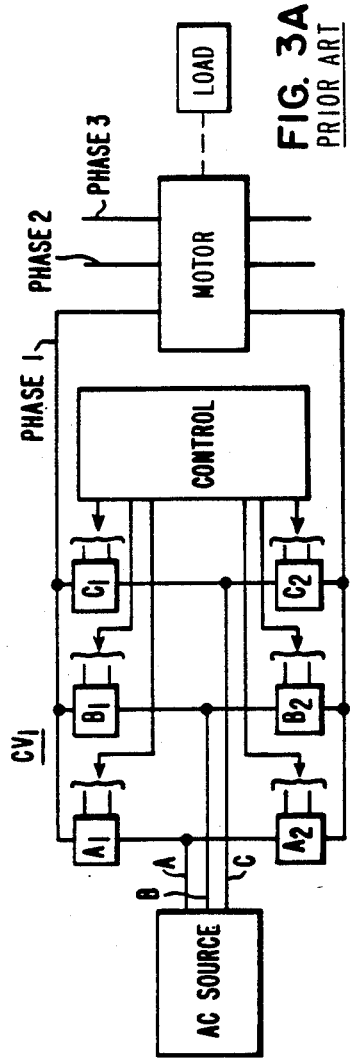
FIG. 3A shows the three phases of FIG. 1 associated with the load.

FIG. 3A shows the UFC conncected with the three phases of the load.

Figure 3:
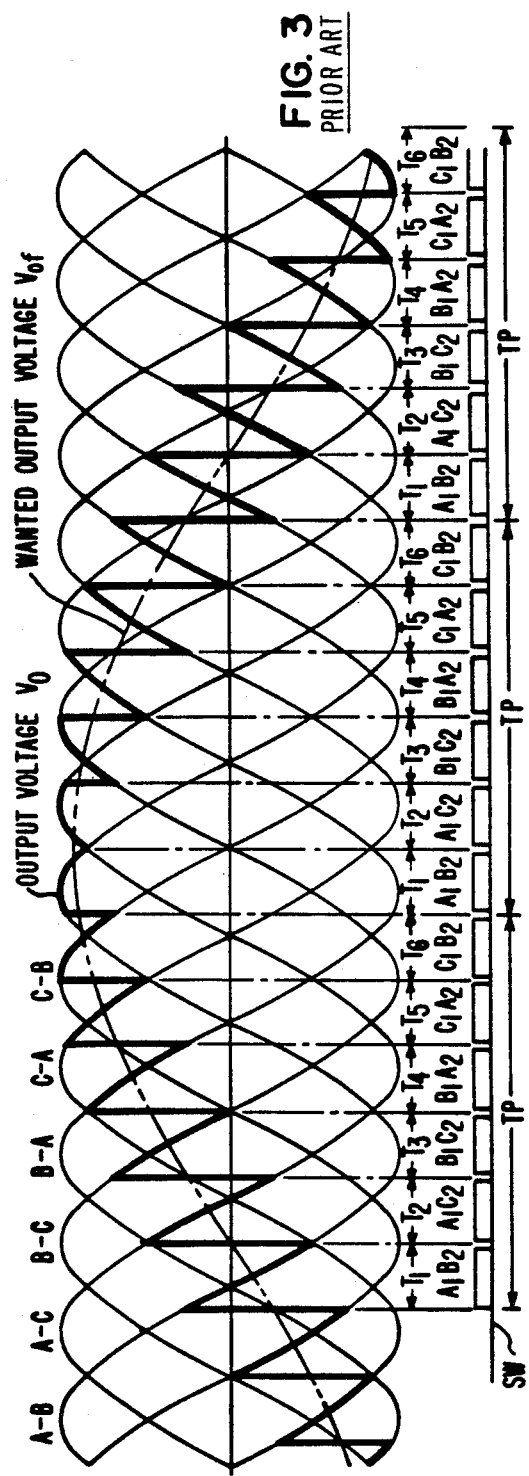
FIG. 3 shows with curves the operation of the system of FIG. 1 and FIG. 3A without exercising any control of the commutated switches of the converters for the purpose of adjusting the magnitude of the output voltage whereas, for comparison purpose.
Figure 4:
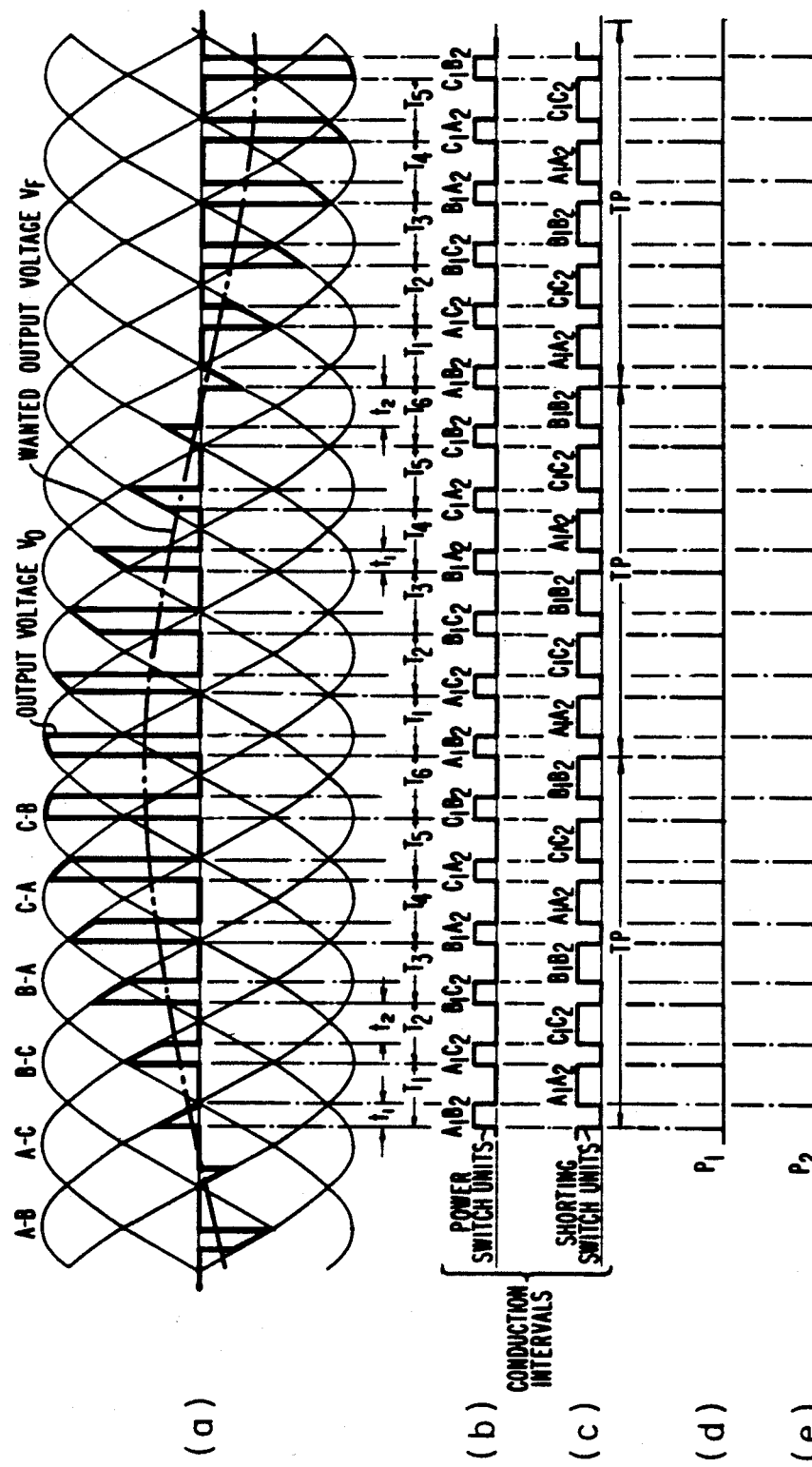
FIG. 4 shows with curves how the control pulse trains P1 and P2 of the system of FIG. 1 establish controlled periods of conduction delineated between controlled shorting periods to adjust the magnitude of the output voltage.

The basic operating principles of the UFC will be better understood by referring to the waveforms shown in FIGS. 3 and 4 for one of the three outputs of the UFC. The basic output voltage waveform $V_O$ of the UFC, ignoring for the moment the control of the magnitude of the fundamental component, can be generated by allowing the pairs of switching units $A_1B_2$, $A_1C_2$, $B_1C_2$, $B_1A_2$, $C_1A_2$, $C_1B_2$ to conduct, in that sequence, for a fixed period of time T, so that each of the input line voltages be connected in turn across the load during that pause period of time. The sequence is repeated at a predetermined repetition rate. As illustrated in FIG. 3, such repetitive switching pattern extends over a time period TP defined by the consecutive uniform time frames T, individually indicated at $T_1$, $T_2$, $T_3$, $T_4$, $T_5$, and $T_6$. This switching pattern provides an output voltage wave $V_O$ having a "wanted" fundamental component $V_F$ with a frequency $f_O$ equal to the difference between the AC supply frequency $f_{IN}$ and the repetition frequency $f_{SW}$ of the switching pattern, as explained in the above-mentioned patents.

While FIG. 3 illustrates the operation of a system in which for each bilateral switching unit the conduction interval (T) extends fully between two consecutive switching points NC, e.g. between two ON-coming static switches in the succession ($A_1B_2$, $A_1C_2$, $B_1C_2$, ... $C_1B_2$), FIG. 4 illustrates a system in which the duration of conduction (T) is controlled, e.g. reduced from such maximum duration T to $t_1$. As shown in FIG. 4 this is achieved by shorting the output terminals, that is, the load, during a complementary time interval $t_2 = (T - t_1)$. This is achieved by the pair of switches connected to the same input line ($A_1A_2$, $C_1C_2$, ... $B_1B_2$). Such width-control of $t_1$ within T allows the control of the fundamental output voltage, as explained in either of the two aforementioned patents. This mode of control is characterized by a repetitive switching pattern extending over the time period TP that is defined by six uniformly spaced time frames T labeled $T_1$ through $T_6$. In time frame $T_1$, power switches $A_1$ and $B_2$ are turned on for the time interval $t_1$. At the end of the interval $t_1$, switches $A_1$ and $A_2$ are turned on for the duration of interval $t_2$ to short the load and thereby provide a path for the load current. In the next time frame $T_2$, switches $A_1$ and $C_2$ are turned on for the duraction of interval $t_1$ to apply in increment of input voltage $V_{AC}$ to the load. At the end of interval $t_1$ of time frame $T_2$, switches $A_1$ and $C_2$ are turned off and switches $C_1$ and $C_2$ are turned on for the duration of interval $t_2$ of the same time frame to short the load. The rest of the sequence in the switching pattern should be apparent from examination of FIG. 4. It is also obvious from the figure that pulse train $P_1$ defines the time frame T, and thereby the output frequency of the fundamental or wanted output voltage $V_F$ of output voltage wave $V_O$, whereas pulse train $P_2$ defines the relative length of invervals $t_1$ and $t_2$, in the given time frame T, and thus determines the amplitude of the fundamental component $V_F$.

Figure 5:
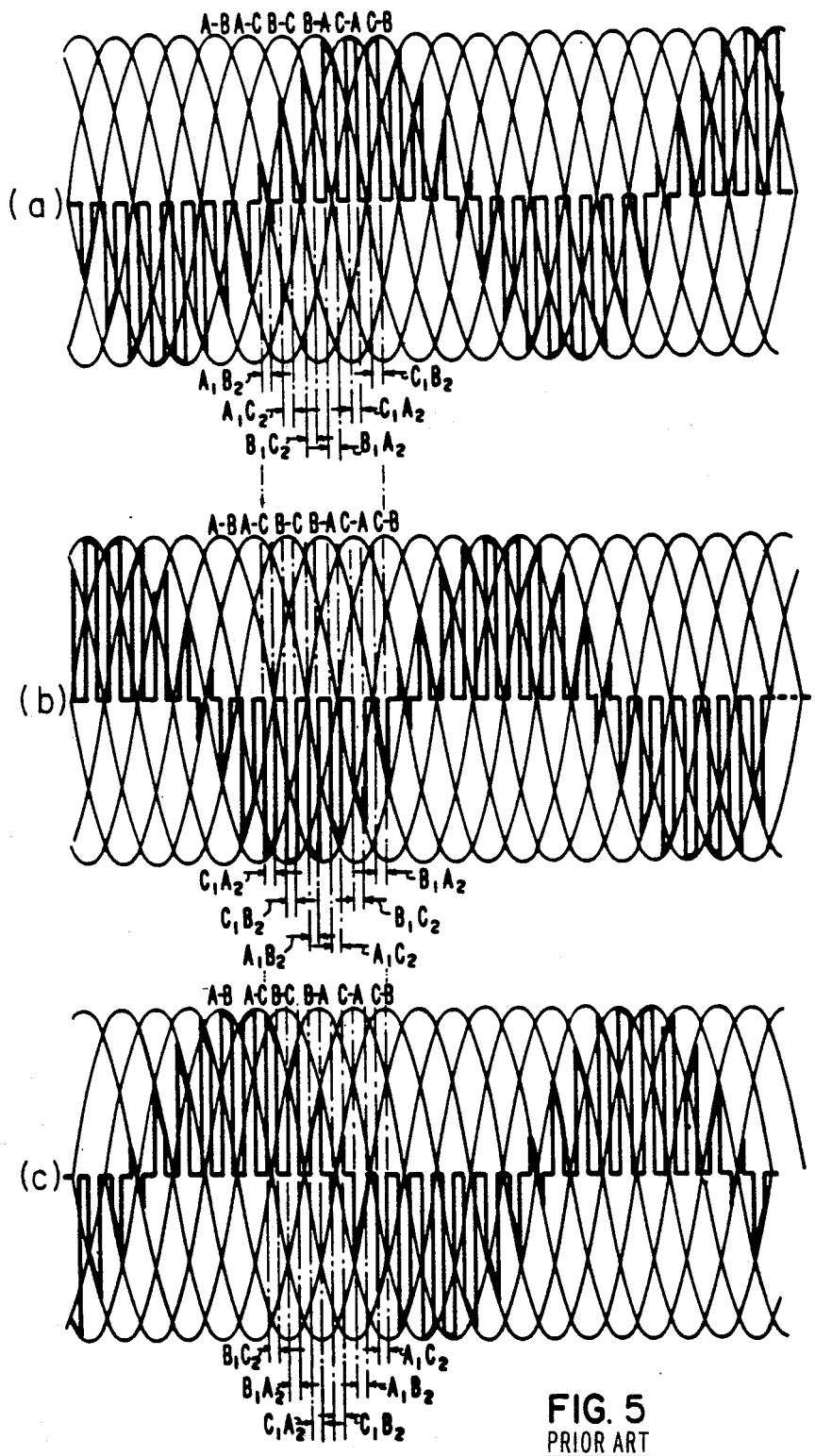
FIGS. 5A–5C are charts with curves comparing the three phases of the UFC system of FIG. 1.
Figure 6A:
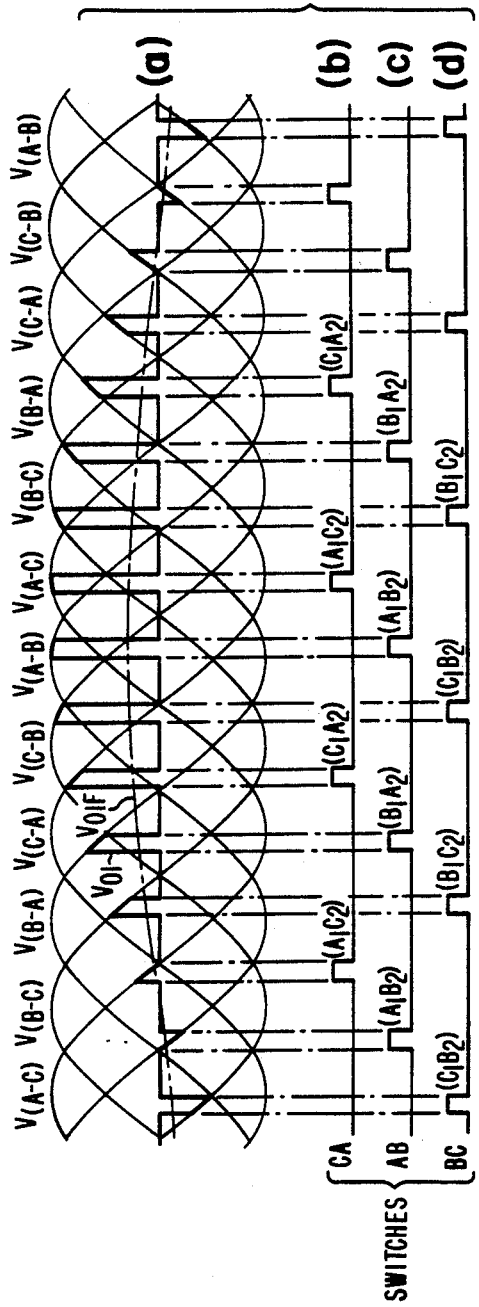
FIGS. 6A–6C give a set of curves illustrating the effect at a reduced output voltage level upon one of the input supply lines with the prior art mode of control.
Figure 6B:
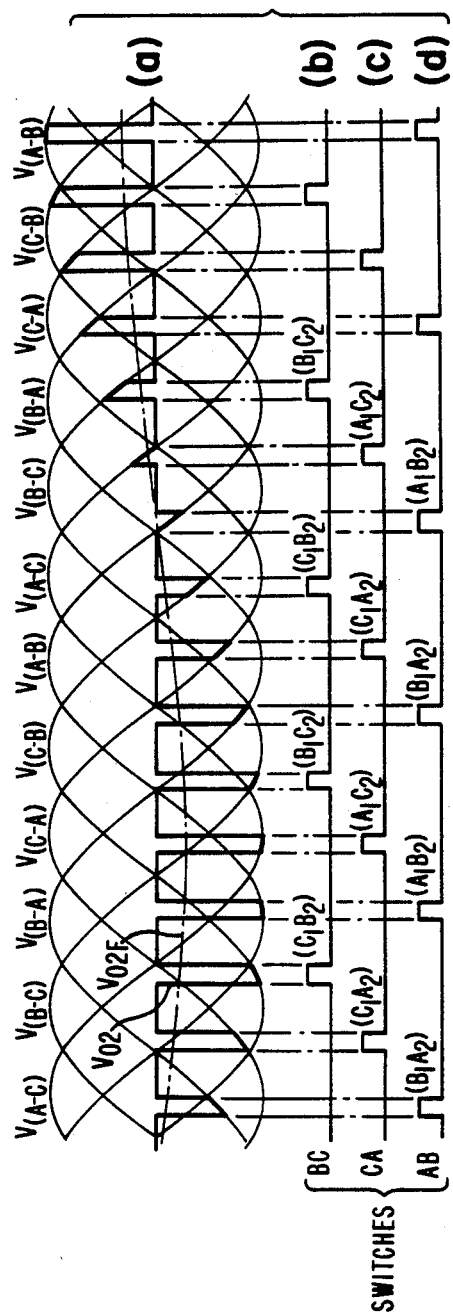
Figure 6C:
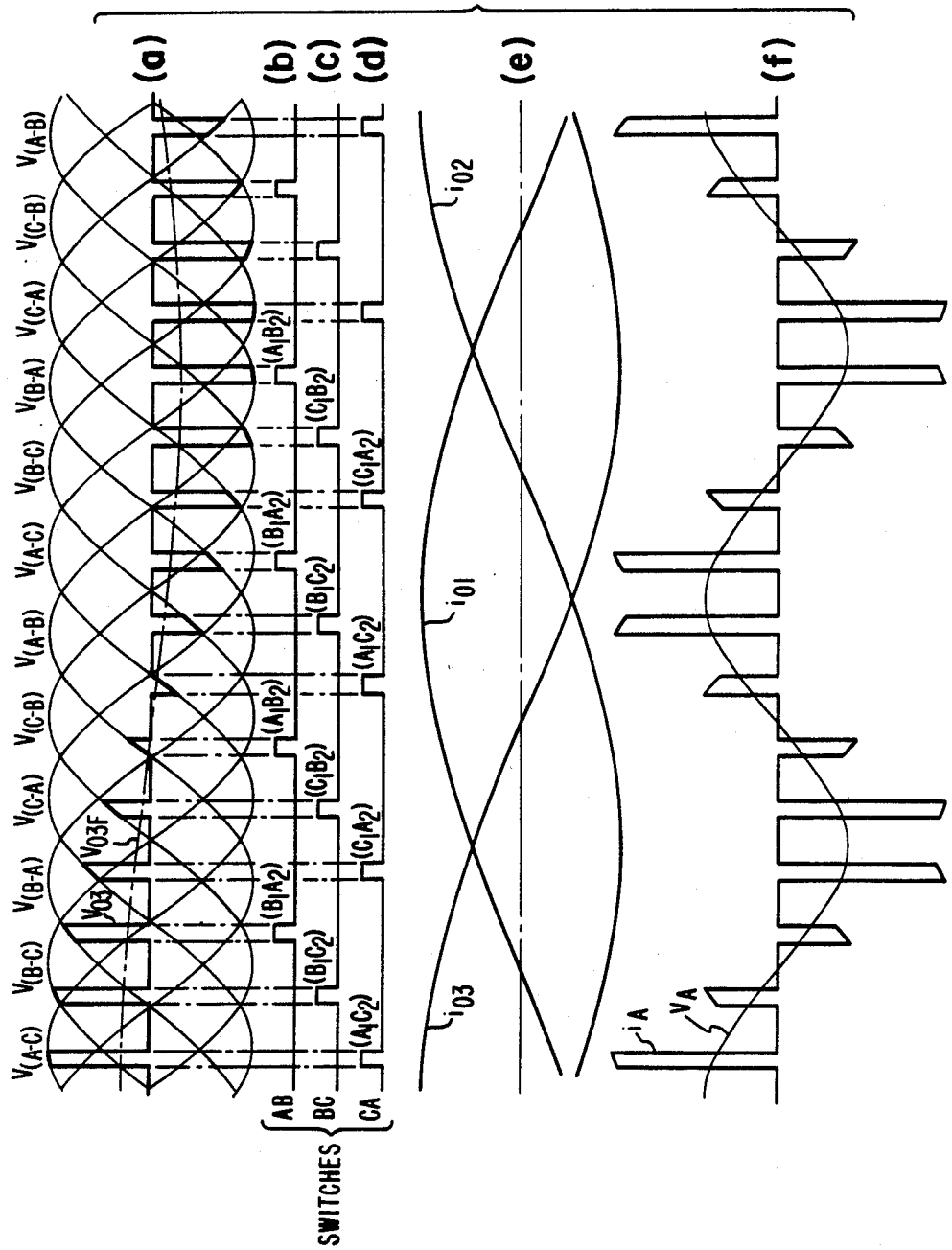

The switching pattern for the three phases of a complete three-phase UFC is shown in FIG. 5 and in FIGS. 6A–6C. The current wave $i_A$, so derived from one of the input lines (A) at a reduced output voltage level $V_A$, is illustrated under (f) in FIG. 6C.

Figure 7:
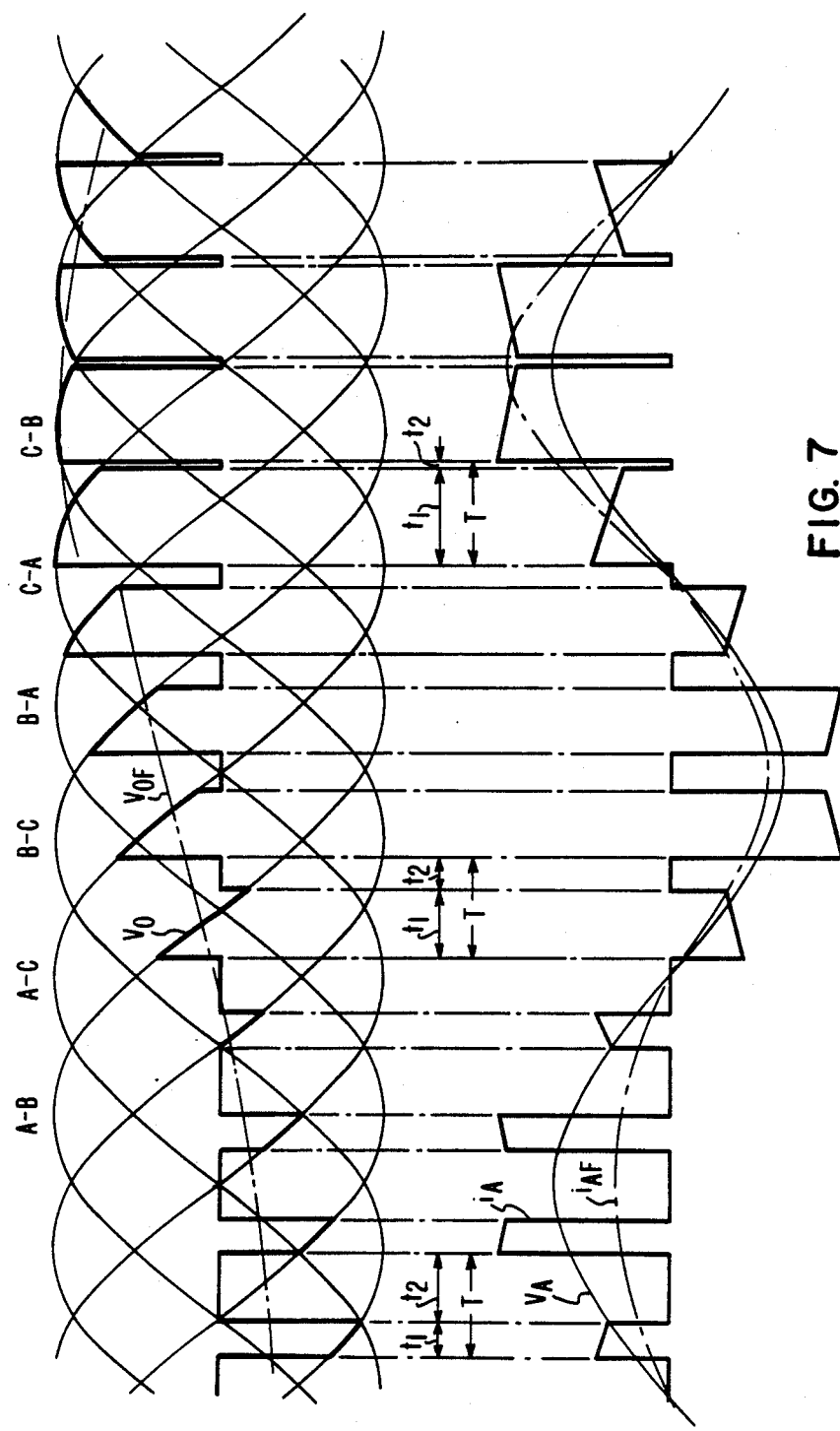
In FIG. 7 are juxtaposed voltage and current curves illustrating conduction periods of increased duration and their effect on the harmonics of the input currents drawn from the AC power source.

One disadvantage of the prior art UFC is that the amplitude of the harmonics in the so derived input current wave $i_A$ (and thus for the total rms current distortion) increase as the fundamental components of the output voltage $V_A$ is decreased by means of decreasing time interval $t_1$, as illustrated in FIG. 7. The reason for this is that at constant rated output current (which corresponds to the rated torque of the motor at any speed), the peak instantaneous values of the input current remain essentially the same (these being determined by the amplitude of the constant output current) whereas the average (or fundamental) input current decreases as the output voltage is decreased at reduced motor speeds. (The power requirements of the motor at a fixed output current and at a reduced fundamental output voltage is provided by the AC input supply at a fixed input voltage and at a reduced fundamental input current). In the prior art UFC, the average input line current is reduced by decreasing the "active" time interval, $t_1$, during which voltage is applied to the motor and current is drawn from the AC supply. Since the average (or fundamental) output voltage approaches zero, the input current becomes composed of a number of narrow current pulses, the width of which approach zero while the zero current (or "passive") interval $t_2$ deferred between those pulses approaches the length of the basic time frame T as the "active" conductive time interval $t_1$ approaches zero.

The frequencies of the harmonic current components can be expressed in terms of the input supply frequency, $f_I$, and the generated output frequency, $f_O$, as follows:

$$f_n = 6mf_O + (6m \pm 1)f_I, \quad m = 1,2,3, \ldots \tag{1'}$$

where $f_I$ is the input supply frequency and $f_O$ is the generated output frequency applied to the motor. At a fixed input frequency, the harmonic frequencies increase with the output frequency from their minimum values of $(6m \pm 1)f_I$. These minimum values correspond to the odd harmonic frequencies: $5f_I$, $7f_I$, $11f_I$, $13f_I$, etc.

From the frequency spectrum (1') it follows that the input filter which is required because a practical input supply would have a non-zero, usually inductive source impedance, would have to have a "cut off" (or resonant) frequency that is lower than $5f_I$—typically it would be $4f_I$—if the speed of the motor and accordingly the output frequency of the UFC, is to be varied from zero to some maximum value.

A control method is now proposed which, in addition to providing a continuously variable output voltage, allows minimizing the amplitude of selected current harmonics. The basic idea is to minimize the amplitudes of input current components of a frequency which would be at, or close to, the resonant frequency of the LC input filter, thereby to prevent harmonic amplification, as the output frequency of the UFC is varied over the specified range. The proposed control method also provides a significant overall improvement in the quality (distortion) of both the output voltage and input current waveforms over that characterizing the aforementioned prior art UFC.

Figure 8:
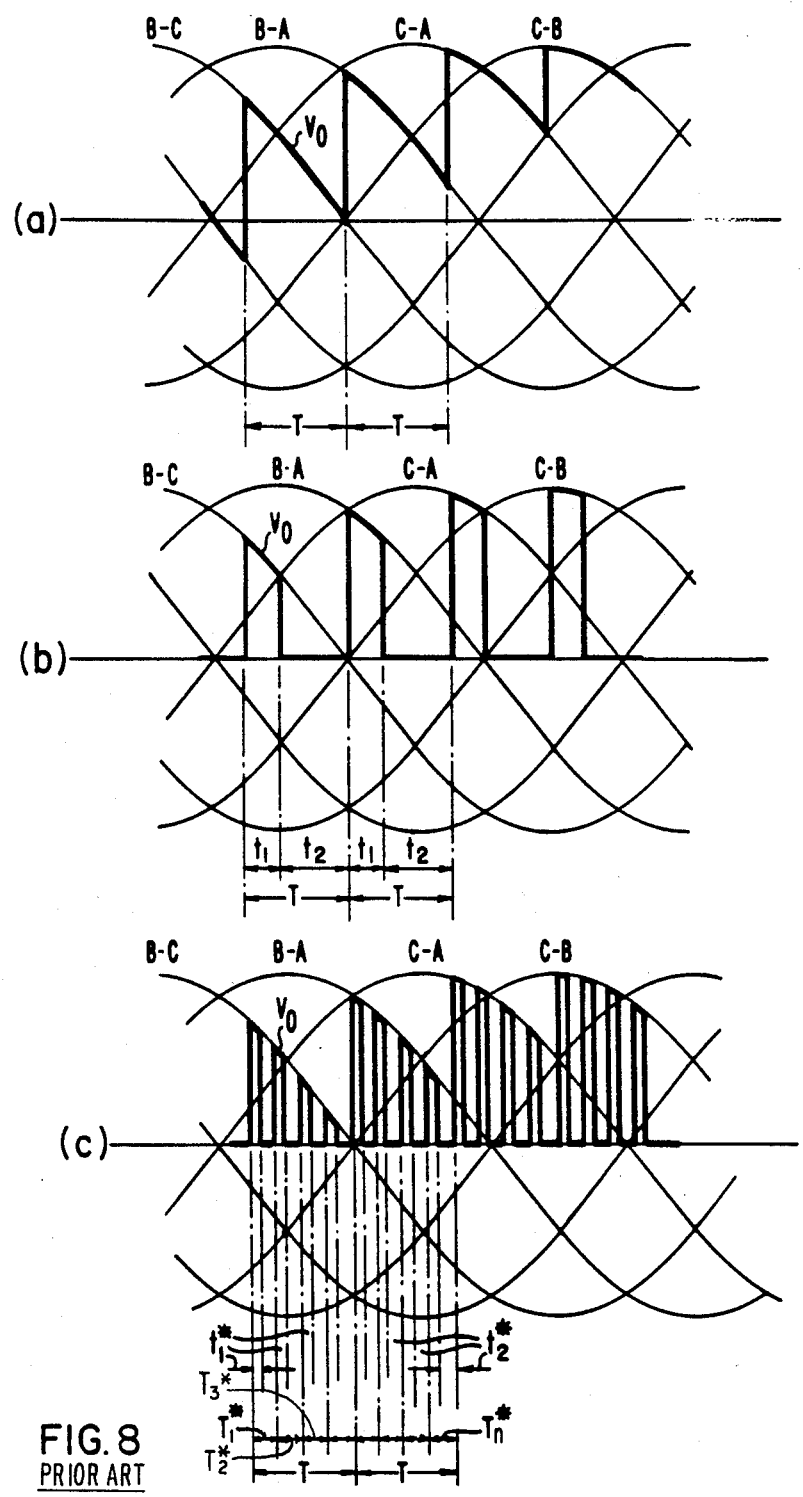
FIGS. 8A–8C illustrate with curves the output voltage control method according to U.S. Pat. No. 4,488,216.

The gist of the output voltge control method according to the invention can best be understood first from a comparison of prior art curves (a) to (c) in FIG. 8.

Under (a), the voltage curves for $V_{BC}$, $V_{BA}$, $V_{CA}$, $V_{CB}$ are the envelopes of the UFC output voltage $V_O$, where the switches are connected the AC input supply voltages in sequence for uniform time duration T to the output (load) without the provision of means for controlling the amplitude of the fundamental component.

Under (b), with the voltage control effected according to one prior art method, as explained previously, the uniform time durations T are subdivided into two intervals $t_1$ and $t_2$. During interval $t_1$, the input supply voltages are, as before, connected to the output by the switches of the power converter. During time intervals $t_2$, the input supply voltages are disconnected and the load is shorted by the switches of the power converter. The relative lengths of intervals $t_1$ and $t_2$ within the basic time duration (or time frame) T determine the amplitude of the fundamental output voltage generated by the UFC.

Under (c), the prior art basic control technique used according to equally spaced subintervals (t*), is illustrated. The uniform time durations T are subdivided into n (n equals four in FIG. 8) subintervals of durations $T_1^*$, $T_2^*$, $T_3^*$, ... $T_n^*$ such that:

$$\sum_{k=1}^{n} T_k^* = T$$

Each subinterval $T_1^*$, $T_2^*$, $T_3^*$, ..., $T_n$ is in turn subdivided into two intervals $t_{11}^*$ and $t_{12}^*$, $t_{21}^*$ and $t_{22}^*$, $t_{31}^*$ and $t_{32}^*$, ..., $t_{n1}^*$ and $t_{n2}^*$, that is:

$$t_{11}^* + t_{12}^* = T_1^*$$
$$t_{21}^* + t_{22}^* = T_2^*$$
$$t_{31}^* + t_{32}^* = T_3^*$$
$$\vdots$$
$$t_{n1}^* + t_{n2}^* = T_n^*$$

and $$\sum_{k=1}^{n} t_{k1}^* = t_1$$

$$\sum_{k=1}^{n} t_{k2}^* = t_2$$

During such time intervals $t_{11}^*$, $t_{21}^*$, $t_{31}^*$, ... $t_{n1}^*$, within each time frame T, the same input supply voltage, which is occurring from the input side in the normal UFC sequence, is connected repeatedly n times to the output, whereas during time intervals $t_{12}^*$, $t_{22}^*$, $t_{32}^*$, ..., $t_{n2}^*$, the input supply voltage is disconnected from the output, the load being as before, shorted. Since $t_{11}^* + t_{12}^* + t_{13}^* + \ldots + t_{1n}^* = t_1$ and $t_{21}^* + t_{22}^* + t_{32}^* + \ldots t_{n2}^* = t_2$, it is evident that the fundamental component of the output voltage wave will be the same as obtained under (a).

The simplest form of control is obtained when all of the subintervals of the same kind are made equal. This is the mode of control disclosed in U.S. Pat. No. 4,488,216.

In such case:

$$T_1^* = T_2^* = T_3^* = \ldots = T_n^* = T^*$$

$$t_{11}^* = t_{21}^* = t_{31}^* = \ldots = t_{n1}^* = t_1^*$$

$$t_{12}^* = t_{22}^* = t_{32}^* = \ldots = t_{n2}^* = t_2^*$$

and $$nt^* = T$$

$$nt_1^* = t_1$$

$$nt_2^* = t_2$$

For identical subintervals, it can be shown that the amplitudes of the most significant harmonics (i.e., those whose frequencies are the lowest) present in the output voltage and in the input current waves decrease significantly (in contrast to control without subdividing the active interval of conduction into subintervals where the amplitudes of the most significant harmonics increase), when the amplitude of the fundamental output voltage is decreased. In particular, if n=2, the amplitudes of the output voltage components with frequencies of $(6f_I + 5f_O)$ and $(6f_I + 7f_O)$, and those of the related input current components with $(6f_O + 5f_I)$ and $(6f_O + 7f_I)$, decrease monotonously with decreasing output voltage. It is emphasized again that this is in contrast to the prior art where the amplitudes of such harmonics generally increase with decreasing output voltage. It should be mentioned here that the output voltage and input current harmonics of the UFC are closely related. That is, the frequencies of the harmonic components present in output voltage and input current waveforms can be described by a similar mathematical expression:

$$f_{n \ output\ voltage} = 6mf_I + (6m \pm 1)f_O \qquad (2')$$

where (m = 1,2,3 ... ) and $$f_{n \ input\ current} = 6mf_O + (6m \pm 1)f_I \qquad (3')$$

where (m = 1,2, ... )

Furthermore, the amplitudes of the related output voltage and input current harmonics vary in a similar manner with the variation of the fundamental output voltage.

Figure 9:
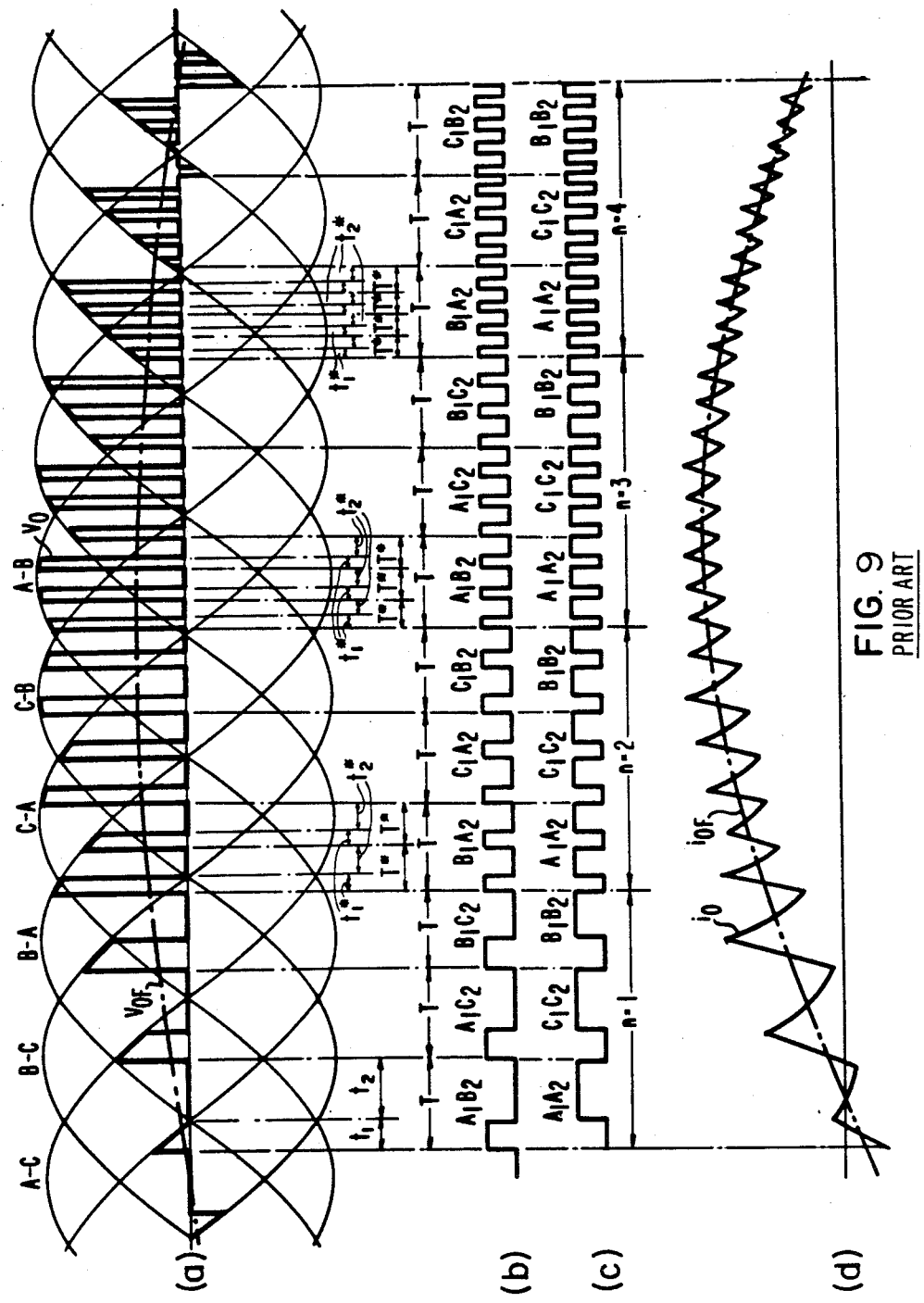
FIG. 9 shows with curves for an increasing number of conduction subintervals how the motor current "ripple" decreases.
Figure 10:
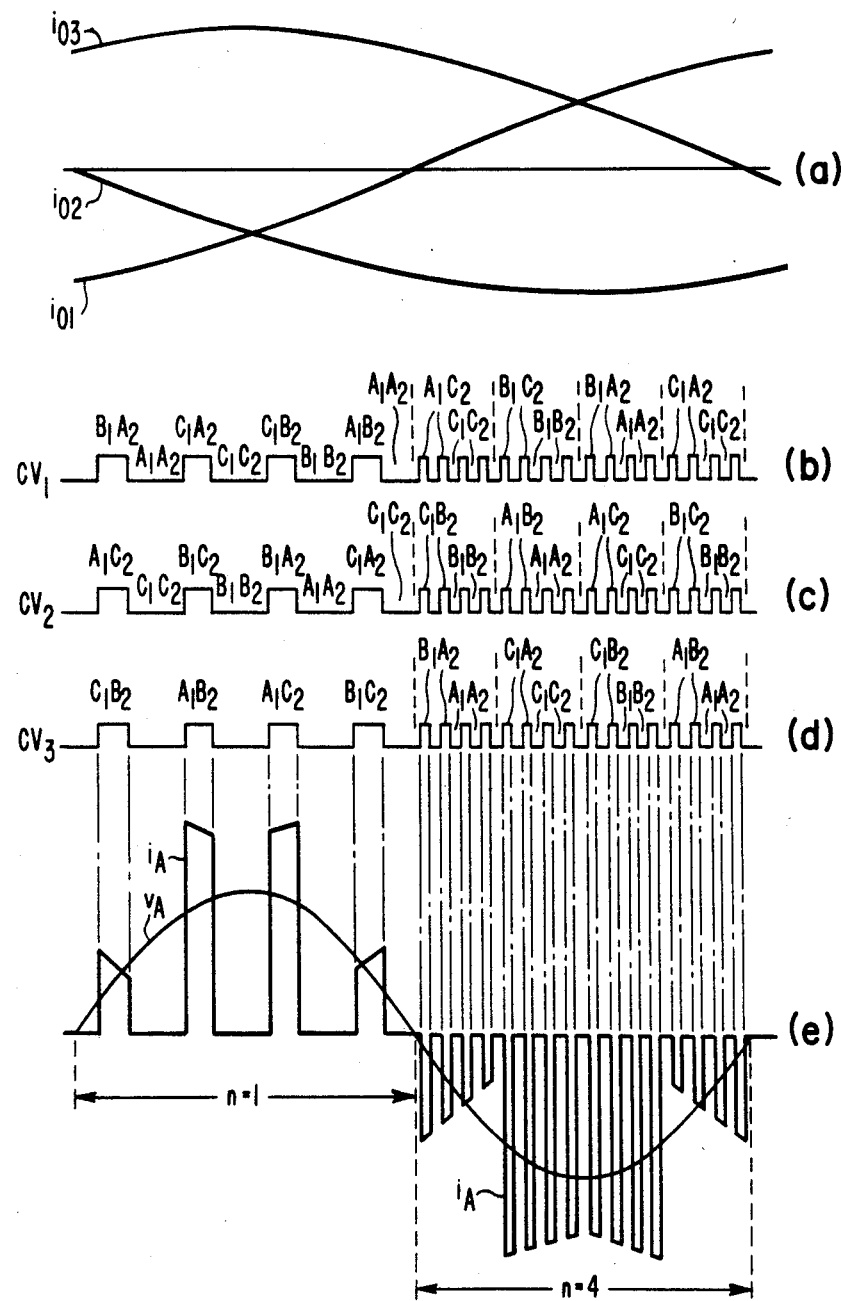
FIG. 10 parallels FIG. 9 by showing the corresponding change in the input current waveform.
Figure 13:
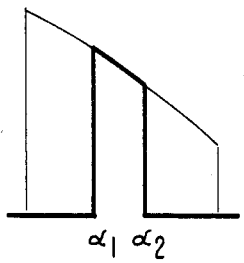
FIG. 13 is the case #1 single pulse-width modulation of FIG. 12A illustrated with edge definition by angles $\alpha_1, \alpha_2$.

As n increases (n=2,3,4 ... ), both in the output voltage and input current waves, the number of harmonics, the amplitude of which decreases in proportion with the decreasing output voltage, increases. As shown for n=2, there are two such components. For n=3, there are four, for n=4, there are six, both in the output voltage and input current waves. These components can be obtained from the expressions (1'), (2') (3') of $f_n$ voltage and $f_{n\ current}$ by substituting m=n−1. As a result of the harmonic reduction, the motor current $i_{of}$ has a "ripple" $i_o$ to which decreases rapidly as the number n of the subdurations T* is increased from one to two, three and four within a basic time frame T at a given output frequency $f_O$, as illustrated in FIG. 9. The change in the input current waveform $i_A$ when increasing n from one to four is illustrated in FIG. 10. It can be observed that the "envelope" of the input current wave at n=4 is similar to that obtained at full output voltage. Therefore, it is evident that the low order harmonics do not increase, as they do without such n subintervals, when the output voltage is decreasing.

With the prior art control method in which all the conduction subintervals $t_1^*$ are kept identical and all shorting subintervals $t_2^*$ are kept identical, the amplitudes of the lowest order input harmonic currents are reduced approximately in proportion to the reduction of the fundamental component. However, the amplitudes of these components still will remain greater than zero at any output frequency. Therefore, although the input filtering requirements are reduced, the cut off (resonant) frequency of the input filter still has to be kept below the fifth harmonic to avoid resonance.

Accordingly, an improved control method is now proposed by which the shorting intervals will no longer be kept identical but rather are varied with the output frequency in such a way that the amplitudes of those components having a frequency which would be at, or close to, the resonant frequency of the input filter is minimized.

The concept on which rests the control method according to the invention can be explained with reference to FIG. 11, where a UFC output voltage waveform with two conduction subintervals ($t_1^*$) ("double" pulse) within the basic time frame (T) is shown. If the output voltage waveform corresponding to the first conduction interval (shown "unfilled") and that corresponding to the second conduction interval (shown "filled") are considered separately, then essentially two output voltage waveforms of the prior art UFC are produced. These waveforms are phased shifted with respect to one another, so that all the shorting subintervals ($t_2^*$) are equal. Each output voltage waveform contains the harmonic components with the same frequencies $6f_I+5f_O$, $6f_I=7f_O$, $12f_I+11f_O$, $12f_I+13f_O$, etc. However, these harmonic components are in fact phase-shifted with respect to each other. As a result they "weaken" each other. In other words, the vectorial sum of two harmonics having the same frequency results in an amplitude that is lower than the algebraic sum of the amplitudes which would be obtained if the output waveform had been constructed with single conduction intervals of double width as in the prior art UFC. It is easy to visualize, and it can be shown mathematically, that any particular harmonic component in the "double pulse" (two conduction subintervals in the basic time frame) can be cancelled out by selecting such shorting subintervals between subsequent active intervals in the time frame as to produce a 180° relative phase shift for the selected harmonic in the "unfilled" and "filled" output waveforms.

More generally, it is observed that wherever multiple pulses are used to modulate a UFC system, such multiple-pulse-width-modulated (PWM) UFC operation can be represented as the sum of single-pulse-width-modulated (PWM) UFC systems. It is also observed that there are two kinds of modulation modes in a single-PWM UFC system.

These two modes will be referred to hereinafter as case #1 and case #2. These two situations are illustrated by FIG. 12A (case #1) and FIG. 12B (case #2). The illustration is made in the siaution of a y-pulse UFC. The existence functions in those two cases are defined as follows:

Case #1

Figure 14:
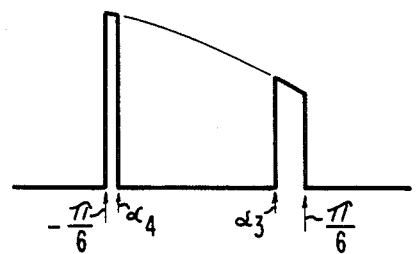
FIG. 14 is the case #2 single pulse-width modulation of FIG. 12B illustrated with edge definition by angles $\alpha_3, \alpha_4$.

The line-to-line existence function of $g_{11}$ is defined by angles ($\alpha_1$, $\alpha_2$) expressed in degrees with respect to the respective edges of the voltage modulation slice, as shown in FIG. 14 and as follows:

$$g_{11} = a_{o1} + \sum_{n=1}^{\infty} (a_n \sin n\omega t + b_n \cos n\omega t) \quad (1)$$

where:

$$a_n = \frac{1}{\pi} \int_{-\pi}^{\pi} g_{11} \sin n\omega t \, d\omega t$$

$$= \frac{1}{\pi} \left[ \int_{d_1}^{d_2} \sin n\omega t \, d\omega t \right]$$

or $$a_n = -\frac{1}{n\pi} [\cos n\omega t]_{\alpha_1}^{\alpha_2} \quad (2)$$

$$= -\frac{1}{n\pi} \{\cos(n\alpha_2) - \cos(n\alpha_1)\}$$

and where:

$$b_n = \frac{1}{\pi} \int_{-\pi}^{\pi} g_{11} \cos n\omega t \, d\omega t \quad (3)$$

$$= \frac{1}{n\pi} [\sin n\omega t]_{\alpha_1}^{\alpha_2}$$

$$= \frac{1}{n\pi} \{\sin(n\alpha_2) - \sin(n\alpha_1)\}$$

Therefore, from relations (1), (2) and (3), it follows that:

$$g_{11} = a_{o1} + \sum_{n=1}^{\infty} \left( -\frac{1}{n\pi} \{\cos(n\alpha_2) - \cos(n\alpha_1)\} \sin n\omega t + \frac{1}{n\pi} \{\sin(n\alpha_2) - \sin(n\alpha_1)\} \cos n\omega t \right) \quad (4)$$

Since $$\{\cos(n\alpha_2) - \cos(n\alpha_1)\}^2 + \{\sin(n\alpha_2) - \sin(n\alpha_1)\}^2 =$$

$$2\{1 - \cos n(\alpha_2 - \alpha_1)\} = 4 \sin^2 n \left( \frac{\alpha_2 - \alpha_1}{2} \right),$$

relation (4) leads to:

$$g_{11} = a_{o1} + \sum_{n=1}^{\infty} \frac{2}{n\pi} \sin n \left( \frac{\alpha_2 - \alpha_1}{2} \right) \cos(n\omega t + \phi_1) \quad (5)$$

where:

$$\phi_1 = \tan^{-1} \left[ \frac{\cos(n\alpha_2) - \cos(n\alpha_1)}{\sin(n\alpha_2) - \sin(n\alpha_1)} \right]$$

$$= -n \left( \frac{\alpha_1 + \alpha_2}{2} \right).$$

Case #2

In the 6-pulse UFC, the modulation limits are ($-\pi/6$, $\pi/6$). If the pulses are separated, as shown in FIG. 14, by these modulation limits, the case can be considered as another kind of single pulse-width-modulated UFC.

In this case, the line-to-line existence function can be represented as:

$$g_{12} = a_{o2} + \sum_{n=1}^{\infty} (a_n \sin n\omega t + b_n \cos n\omega t)$$

where:

$$a_n = \frac{1}{\pi} \int_{-\pi}^{\pi} g_{12} \sin n\omega t \, d\omega t \quad (6)$$

$$= -\frac{1}{n\pi} \left\{ \cos(n\alpha_4) - \cos n\frac{\pi}{6} + \cos n\frac{\pi}{6} - \cos n\alpha_3 \right\}$$

$$= -\frac{1}{n\pi} \{\cos(n\alpha_4) - \cos(n\alpha_3)\}$$

and where:

$$b_n = \frac{1}{\pi} \int_{-\pi}^{\pi} g_{12} \cos n\omega t \, d\omega t \quad (7)$$

$$= \frac{1}{n\pi} \left\{ \sin(n\alpha_4) - \sin(n\alpha_3) + 2\sin\left(n\frac{\pi}{6}\right) \right\}.$$

Therefore, relations (6) and (7) lead to:

$$g_{12} = a_{o2} + \sum_{n=1}^{\infty} -\frac{1}{n\pi} \{\cos(n\alpha_4) - \cos(n\alpha_3)\} \sin n\omega t +$$

$$\frac{1}{n\pi} \{\sin(n\alpha_4) - \sin(n\alpha_3)\} \cos n\omega t + \frac{2}{n\pi} \sin\left(n\frac{\pi}{6}\right) \cos n\omega t$$

or $$g_{12} = a_{o2} + \sum_{n=1}^{\infty} \frac{2}{n\pi} \left\{ \sin\left(n\frac{\pi}{6}\right) \cos n\omega t + \sin n\left(\frac{\alpha_4 - \alpha_3}{2}\right) \cos n\left(\omega t - \frac{\alpha_4 + \alpha_3}{2}\right) \right\} \quad (8)$$

The existence functions just defined can be used to obtain the 6-pulse voltage $v_o$. Thus, the existence functions for case #1 and case #2 are given by relations (5) and (8), respectively. The following is assumed:

$$\alpha_2 - \alpha_1 = \beta_1 (\alpha_2 + \alpha_1)/2 = \delta_1$$

$$\alpha_4 - \alpha_3 = \beta_2 (\alpha_4 + \alpha_3)/2 = \delta_2 \quad (9)$$

then relations (5) and (8) become:
(1) for case #1:

$$g_{11} = a_{o1} + \sum_{n=1}^{\infty} \frac{2}{n\pi} \sin\left(n\frac{\beta_1}{2}\right) \cos n(\omega t - \delta_1) \quad (10)$$

(2) for case #2:

$$g_{12} = a_{o2} + \sum_{n=1}^{\infty} \frac{2}{n\pi} \left( \sin\left(n\frac{\pi}{6}\right) \cos n\omega t + \right. \quad (11)$$

$$\left. \sin n\frac{\beta_2}{2} \cos n(\omega t - \delta_2) \right\}$$

Then, the output voltage $v_o$ is given by $$v_o = \sum_{p=0}^{2} g_p v_{lp} \quad (12)$$

where $v_{lp}$ represents the line-to-line voltage at the input, namely:

$$v_{lp} = V_{LL} \cos(\omega_I t - 2p\pi/3).$$

From relations (10) and (12), it follows that the output voltage for case #1 is:

$$v_{o1}\bigg|^{(3)}_{\text{case }1} = \quad (13)$$

$$V_{LL} \sum_{p=0}^{2} \sum_{n=1}^{\infty} \frac{2}{n\pi} \sin\left(n\frac{\beta_1}{2}\right) \cos\{n(\omega t - \delta_1 - 2p\pi/3)\} \cdot$$

$$\cos(\omega_I t - 2p\pi/3).$$

where: $\omega t = \omega_I t + \omega_o t = \theta_I + \theta_o$, then relation (13) becomes $$v_{o1}\bigg|^{(3)}_{\text{case }1} = \quad (14)$$

$$\frac{V_{LL}}{\pi} \sum_{p=0}^{2} \sum_{n=1}^{\infty} \frac{\sin n\frac{\beta_1}{2}}{n} \{\{\cos[(n+1)(\theta_I - 2p\pi/3) + n(\theta_o - \delta_1)] + \cos[(n-1)(\theta_I - 2p\pi/3) + n(\theta_o - \delta_1)]\}\}$$

$$= \frac{3}{\pi} V_{LL} \left( \sin\frac{\beta_1}{2} \cos(\theta_o - \delta_1) + \sum_{k=1}^{\infty} \frac{\sin(3k \pm 1)\frac{\beta_1}{2}}{3k \pm 1} \cos\{3k\theta_I + (3k \pm 1)(\theta_o - \delta_1)\} \right)$$

For a 6-pulse output, this reads:

$$v_{o1}\bigg|^{(6)}_{\text{case }1} = v_{o1}\bigg|^{(3)}_{\text{case }1} + v_{o1}(\theta_I - \pi)\bigg|^{(3)}_{\text{case }1} \quad (15)$$

$$= \frac{6}{\pi} V_{LL} \left( \sin\frac{\beta_1}{2} \cos(\theta_o - \delta_1) + \sum_{k=1}^{\infty} \frac{\sin(6k \pm 1)\frac{\beta_1}{2}}{6k \pm 1} \cos\{6k\theta_I + (6k \pm 1)(\theta_o - \delta_1)\} \right)$$

Similarly, the output voltage for case #2 is:

$$v_{o1}\bigg|_{\text{case 2}}^{(6)} = \frac{6}{\pi} V_{LL} \bigg(\bigg\{\sin\frac{\pi}{6}\cos\theta_o + \sin\frac{\beta_2}{2}\cos(\theta_o - \delta_2)\bigg\} + \tag{16}$$

$$\sum_{k=1}^{\infty} \frac{\sin(6k \pm 1)\frac{\pi}{6}}{6k \pm 1} \cos\{6k\theta_I + (6k \pm 1)\theta_o\} +$$

$$\sum_{k=1}^{\infty} \frac{\sin(6k \pm 1)\frac{\beta_2}{2}}{6k \pm 1} \cos\{6k\theta_I + (6k \pm 1)(\theta_o - \delta_2)\}\bigg)$$

These two expressions of the 6-pulse voltage under relations (15) and (16) belong to two different single pulse-width-modulated 6-pulse UFC systems. The output voltage expressions for the multiple PWM UFC cases can be generally obtained by the sum of such single pulse-width-modulated expressions provided a proper phase shift is accounted for. As in the case of a single pulse-width-modulated UFC, there are two kinds of multiple PWM UFC's. If one of the multi-pulses is separated by the modulation limits ($\pm\pi/6$), the expressions for the multiple PWM UFC's can be obtained by the sum of case #1+case #2 (referred to as Type B). Otherwise, they can be expressed by the sum of case situations only (referred to as Type A).

Type A

For M blocks of pulses, the expressions for the type A becomes $$v_o\bigg|_{\text{type }A} = \frac{6}{\pi} V_{LL} \bigg(\sum_{m=1}^{M} \sin\bigg(\frac{\beta_m}{2}\bigg) \cos(\theta_o\delta_m) + \tag{17}$$

$$\sum_{m=1}^{M} \sum_{k=1}^{\infty} \frac{\sin(6k \pm 1)\frac{\beta_m}{2}}{6k \pm 1} \cos\{6k\theta_I + (6k \pm 1)(\theta_o - \delta_m)\}\bigg)$$

Type B

For the Type B, it becomes $$v_o\bigg|_{\text{type }B} = \frac{6}{\pi} V_{LL} \bigg(\sum_{m=1}^{M} \sin\bigg(\frac{\beta_m}{2}\bigg) \cos(\theta_o - \delta_m) + \tag{18}$$

$$\sum_{m=1}^{M} \sum_{k=1}^{\infty} \frac{\sin(6k \pm 1)\frac{\beta_m}{2}}{6k \pm 1} \cos\{6k\theta_I + (6k \pm 1)(\theta_o - \delta_m)\}\bigg)$$

where
$\beta_o = \pi/3$, $\delta_o = 0$

The corresponding waveforms are illustrated in FIGS. 15A-15D. FIG. 15A shows Type A, with M=2. FIG. 15B shows type B with M=3. Whereas FIG. 15C is Type A with M=3 and FIG. 15D is Type B with M=3.

The above expressions (17) and (18) are more general than the preceding ones.

The input current for a 6-pulse UFC system can be derived from the line-to-line existence functions given by relations (10), (11). In order to get the line-to-neutral current in the input, the line-to-line current $i_{I\Delta}$ is first being calculated as follows:

$$[i_{I\Delta}] = [g][i_{o\Delta}] \tag{19}$$

where:

$$[i_{o\Delta}] = \frac{1}{\sqrt{3}} \begin{bmatrix} I_o \cos(\theta_o - \phi_o) \\ I_o \cos(\theta_o - \phi_o - \frac{2\pi}{3}) \\ I_o \cos\left(\theta_o - \phi_o - \frac{4\pi}{3}\right) \end{bmatrix}$$

and where $I_o$ is the peak phase current of the load.

For the type 1 single pulse-width-modulated case, $i_I$ can be calculated from relations (10), (19) as follows:

$$i_{I o1}\bigg|_{\text{case 1}}^{(3)} \tag{20}$$

$$= \frac{I_o}{3} \sum_{p=0}^{2} \sum_{n=1}^{\infty} \frac{2}{n\pi} \sin\bigg(n\frac{\beta_1}{2}\bigg) \cos\bigg\{n\bigg(\theta_o + \theta_I - \delta - p\frac{2\pi}{3}\bigg)\bigg\} \cdot \cos\bigg(\theta_o - \phi_o - p\frac{2\pi}{3}\bigg)$$

$$= \frac{I_o}{3} \sum_{p=0}^{2} \sum_{n=1}^{\infty} \frac{1}{n\pi} \sin\bigg(n\frac{\beta_1}{2}\bigg) \cdot$$

$$\bigg(\cos\bigg\{n(\theta_I - \delta_1) + (n+1)\bigg(\theta_o - p\frac{2\pi}{3}\bigg) - \phi_o\bigg\} +$$

$$\cos\bigg\{n(\theta_I - \delta_1) + (n-1)\bigg(\theta_o - p\frac{2\pi}{3}\bigg) + \phi_o\bigg\}\bigg)$$

$$= \frac{3I_o}{\pi 3}\bigg(\sin\frac{\beta_1}{2}\cos(\theta_I - \delta + \phi_o) +$$

$$\sum_{k=1}^{\infty} \frac{\sin\{(3k \pm 1)\frac{\beta_1}{2}\}}{3k \pm 1} \cos\{(3k \pm 1)(\theta_I\delta_1) + 3k\theta_o \pm \phi_o\}\bigg)$$

For a 6-pulse UFC system, the line-to-line input current becomes:

$$i_{I\Delta 1}\bigg|_{\text{case 1}}^{(6)} = i_{I\Delta 1}\bigg|_{\text{case 1}}^{(3)} + i_{I\Delta 1}(\theta_o - \pi)\bigg|_{\text{case 1}}^{(3)} \tag{21}$$

$$= \frac{6I_o}{\pi\sqrt{3}}\bigg(\sin\frac{\beta_1}{2}\cos(\theta_I - \delta_1 + \phi_o) +$$

$$\sum_{k=1}^{\infty} \frac{\sin\bigg\{(6k \pm 1)\frac{\beta_1}{2}\bigg\}}{6k \pm 1} \cos\{(6k \pm 1)(\theta_I\delta_1) + 6k\theta_o \pm \phi_o\}\bigg)$$

From relation (21), the phase current $i_{I1}$ is obtained as follows:

$$i_{I1}\Big|_{\text{case 1}}^{(6)} = i_{I\Delta1}\Big|_{\text{case 1}}^{(6)} + i_{I\Delta1}\left(\theta_I + \frac{\pi}{3}\right)\Big|_{\text{case 1}}^{(6)} \quad (22)$$

$$= \frac{6I_o}{\pi\sqrt{3}}\left(\sin\frac{\beta_1}{2}\left\{\cos(\theta_I\delta_1 + \phi_o) + \cos\left(\theta_I - \delta_1 + \phi_o + \frac{\pi}{3}\right)\right\} + \right.$$

$$\sum_{k=1}^{\infty}\frac{\sin\left\{(6k \pm 1)\frac{\beta_1}{2}\right\}}{6k \pm 1}\left[\cos\{(6k \pm 1)(\theta_I - \delta_1) + 6k\theta_o \pm \phi_o\} + \cos\left\{(6k \pm 1)\left(\theta_I - \delta_1 + \frac{\pi}{3}\right) + 6k\theta_o \pm \phi_o\right\}\right]\right)$$

or $$i_{I1}\Big|_{\text{case 1}}^{(6)} = \frac{6I_o}{\pi}\left(\sin\frac{\beta_1}{2}\cos\left(\theta_I - \delta_1 + \phi_o + \frac{\pi}{6}\right) + \right.$$

$$\sum_{k=1}^{\infty}\frac{\cos k\pi}{6k \pm 1}\sin\left\{(6k \pm 1)\frac{\beta_1}{2}\right\}\cos\left\{(6k \pm 1)\left(\theta_I - \delta_1 + \frac{\pi}{6}\right) + 6k\theta_o \pm \phi_o\right\}\right)$$

Like in the case of the output voltage, the input phase current for the type A multiple pulse-width-modulation (under M blocks) is given by the sum of the case #1 single pulse-width-modulated currents which are given by relation (22). Therefore:

$$i_{I1}\Big|_{\text{type }A} = \qquad (23)$$

$$\frac{6}{\pi}I_o\left(\sum_{m=1}^{M}\sin\left(\frac{\beta_m}{2}\right)\cos\left(\theta_I + \phi_o + \frac{\pi}{6} - \delta_m\right) + \right.$$

$$\sum_{m=1}^{M}\sum_{k=1}^{\infty}\frac{\cos k\pi \sin\left\{(6k \pm 1)\frac{\beta_m}{2}\right\}}{6k \pm 1}\cos\left\{(6k \pm 1)\left(\theta_I + \frac{\pi}{6} - \delta_m\right) + 6k\theta_o \pm \phi_o\right\}$$

-continued $$= \frac{6}{\pi}I_o\left(\sum_{m=1}^{M}\sin\left(\frac{\beta_m}{2}\right)\cos\left(\theta_I + \phi_o + \frac{\pi}{6} - \delta_m\right) + \sum_{m=1}^{M}\sum_{k=1}^{\infty}\frac{\sin\left\{(6k \pm 1)\frac{\beta_m}{2}\right\}}{6k \pm 1}\cos\left\{(6k \pm 1)(\theta_I - \delta_m) + 6k\theta_o \pm \left(\phi_o + \frac{\pi}{6}\right)\right\}\right)$$

Similarly, the input phase current for type B multiple pulse-width-modulation is given by $$i_{I1}\Big|_{\text{type }B} = \frac{6}{\pi}I_o\left(\sum_{m=1}^{M}\sin\left(\frac{\beta_m}{2}\right)\cos\left(\theta_I + \phi_o + \frac{\pi}{6} - \delta_m\right) + \sum_{m=1}^{M}\sum_{k=1}^{\infty}\frac{\sin\left\{(6k \pm 1)\frac{\beta_m}{2}\right\}}{6k \pm 1}\cos\left\{(6k \pm 1)(\theta_I - \delta_m) + 6k\theta_o \pm \left(\phi_o + \frac{\pi}{6}\right)\right\}\right) \quad (24)$$

where
$\beta_o = \pi/3$, $\delta_o = 0$.

Figure 16:
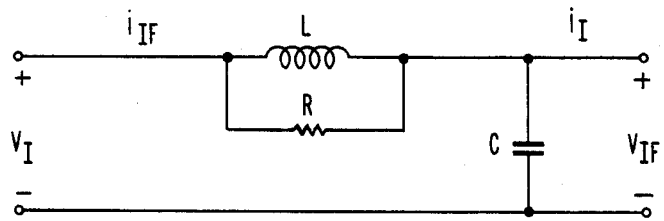
FIG. 16 shows a parallel-R-type second-order low-pass filter as can be associated with the UFC system when practicing the invention.

A filter is required at the input of a UFC system. It is generally a second order lowpass filter. FIG. 16 illustrates a parallel-R-type second-order lowpass filter, including an LR parallel network in the horizontal branch and a capacitor C in the vertical branch, where the filtered input current is $i_{IF}$, with an input voltage $v_I$ and of filtered voltage $v_{IF}$ and output current $i_I$.

The transfer function of such a filter is given by $$\overline{A}_I = \frac{v_{IF}}{v_I} = \frac{i_{IF}}{i_I} \quad (25)$$

and $$|\overline{A}_I(i\omega)| = \frac{\left[1 + \left\{\frac{1}{Q}\left(\frac{\omega}{\omega_r}\right)\right\}^2\right]^{\frac{1}{2}}}{\left\{1 - \left(\frac{\omega}{\omega_r}\right)^2\right\}^2 + \left\{\frac{1}{Q}\left(\frac{\omega}{\omega_r}\right)\right\}^2}$$

where: $Q = R\sqrt{\frac{C}{L}}$

Figure 16A:
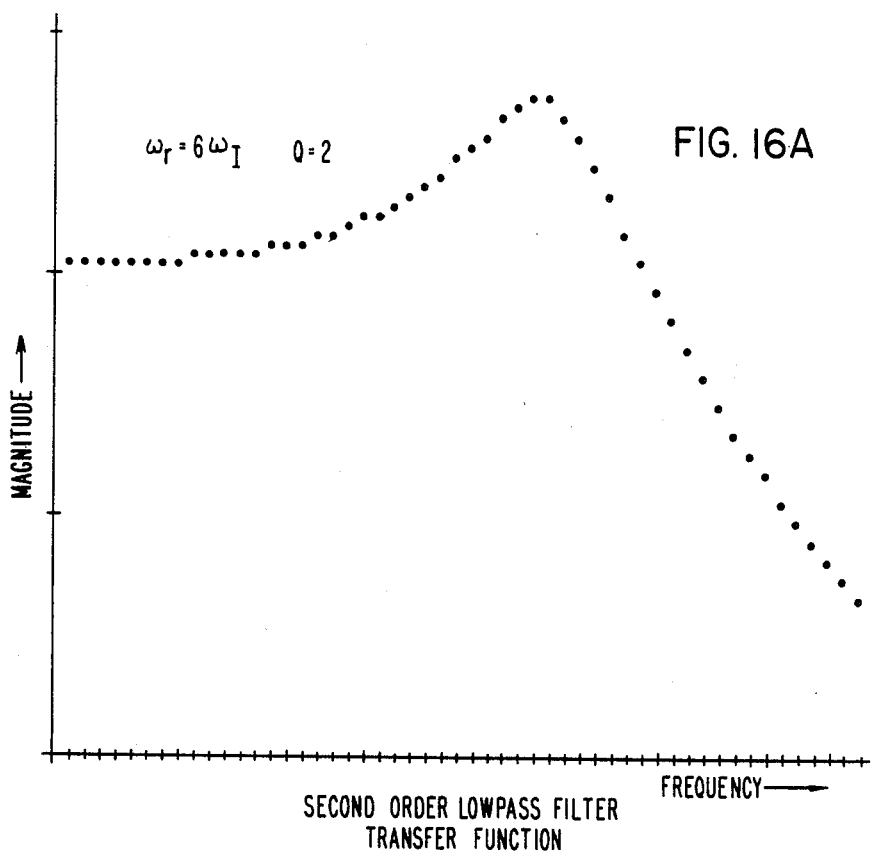
FIG. 16A is the resonance characteristic of the filter of FIG. 16 when $\omega_r = 6\omega_j$ and Q=2.

The second-order lowpass filter characteristic according to equation (25) is plotted in FIG. 16A, for $\omega_r = 8\omega_I$ and $Q=2$ for the purpose of illustration.

Similar characteristics are readily ascertained by experience and calculations for $\omega_r = 8\omega_I$ and for $Q=10$, for instance, for $\omega_r = 6\omega_I$ and $Q=10$ or $\omega_r = 8\omega_I$ and $Q=2$, as well.

From relations (23) to (25), the filtered input current $i_{IF}$ is derived as follows:

$$i_{IF}\bigg|_{\substack{\text{type A}\\ \text{or B}}} = \tag{26}$$

$$\frac{6}{\pi} I_0 \left\{ \sum_{\substack{m=1\\ \text{or 0}}}^{M} |\overline{A}_I(j\omega_I)| \sin\left(\frac{\beta_m}{2}\right) \cos(\theta_I + \psi_I - \delta_m) + \right.$$

$$\sum_{\substack{m=1\\ \text{or 0}}}^{M} \sum_{k=1}^{\infty} |\overline{A}_{Ik}(\pm)| \cdot \frac{\sin\left\{(6k\pm1)\frac{\beta_m}{2}\right\}}{6k\pm1} \cdot$$

$$\left. \cos\{(6k\pm1)(\theta_I - \delta_m) + 6k\theta_0 + \psi_{Ik}(\pm))\} \right\}$$

where:

$$\overline{A}_{Ik}(\pm) = \overline{A}_I\{(6k\pm1)\theta_I + 6k\theta_0\}$$

$$\psi_I = \phi_0 + \frac{\pi}{6} + \arg\{\overline{A}_I(j\omega_I)\}$$

$$\psi_{Ik}(\pm) = \pm\left(\phi_0 + \frac{\pi}{6}\right) + \arg\{\overline{A}_{Ik}(\pm)\}$$

The filtered total harmonic rms current in the input, $i_{HR}$, is given by:

$$i_{HR}\bigg|_{\substack{\text{type A}\\ \text{or B}}} = \frac{6}{\pi} \cdot \frac{I_0}{\sqrt{2}} \left[ \sum_{k=1}^{\infty} \frac{1}{(6k\pm1)^2} \cdot \{|\overline{A}_{Ik}(\pm)|\}^2 \cdot \right.$$

$$\left( \left\{ \sum_{\substack{m=1\\ \text{or 0}}}^{M} \sin(6k\pm1)\frac{\beta_m}{2} \cos\delta_m \right\}^2 + \right.$$

$$\left. \left. \left\{ \sum_{\substack{m=1\\ \text{or 0}}}^{M} \sin(6k\pm1)\frac{\beta_m}{2} \sin\delta_m \right\}^2 \right) \right]^{\frac{1}{2}}$$

where:

$$\beta_0 = 0$$

If the existence functions are centered on 0 degrees ($[-\pi/6, 0]$, $[0, \pi/6]$) are symmetrical, then:

$$\sum_{m=1}^{M} \sin(6k\pm1)\frac{\beta_m}{2} \sin\delta_m = 0 \text{ for any } k = 1, 2, \ldots \tag{28}$$

The harmonic rms current in such symmetrical modulation situation can be obtained from relations (27) and (28) as follows:

$$i_{HR}\bigg|_{\substack{\text{Symmetrical}\\ \text{type A}\\ \text{or B}}} = \frac{6}{\pi} \cdot \tag{29}$$

$$\frac{I_0}{\sqrt{2}} \left[ \sum_{k=1}^{\infty} \frac{\{|\overline{A}_{Ik}(\pm)|\}^2}{(6k\pm1)^2} \cdot \left\{ \sum_{\substack{m=1\\ \text{or 0}}}^{M} \sin(6k\pm1)\frac{\beta_m}{2} \cos\delta_m \right\}^2 \right]^{\frac{1}{2}}$$

In order to reduce filter size, it is necessary to increase the resonant frequency. At the same time, filter insertion loss and excessive extrabasal currents due to the resonance should be minimized. It is almost impossible to meet all such requirements with a conventional symmetrical fixed angle modulation of a UFC system. If the two lowest components, ($5\omega_I + 6\omega_0$) and ($7\omega_I + 6\omega_0$), could both be eliminated by proper modulation, it would be possible. Unfortunately, such a favorable condition for all range of output voltages do not exist. As an alternative, one of the two components only can be eliminated for all range of output voltages if the proper modulation method is used. As a compromise, though, using this characteristic and combining with a lowpass filter, will allow substantailly to reduce extrabasal current in the input side. An optimization modulation to minimize the filtered extrabasal current in the input is as follows:

Starting with nonlinear equations the zero solution can be sought by using a linearization technique. A set of nonlinear equations is assumed to be:

$$[\widetilde{f}(\widetilde{X})] = 0 \tag{30}$$

where:

$$\widetilde{f} = [f_1, f_2 \ldots f_l]^T$$

$$\widetilde{X} = [X_1, X_2 \ldots X_N]^T,$$

Then, equation (3) can be solved by iterative calculations with a computer. The steps involved in computing a solution are as follows.

1. Guess a set of initial values for $\widetilde{X}$, that is, $$\widetilde{X}^0 = [X_1^0, X_2^0, \ldots X_N^0]^T. \tag{31}$$

2. Solve $d\widetilde{X}$ from the linearized equation:

$$[\widetilde{f}(\widetilde{X}^0)] + \frac{d\widetilde{f}(\widetilde{X}^0)}{dX} d\widetilde{X} = 0 \tag{33}$$

where:

$$\frac{d\widetilde{f}(\widetilde{X}^0)}{dX} = \begin{bmatrix} \frac{\partial f_1}{\partial X_1} & \frac{\partial f_1}{\partial X_2} & \cdots & \frac{\partial f_1}{\partial X_N} \\ \frac{\partial f_2}{\partial X_1} & \frac{\partial f_2}{\partial X_2} & \cdots & \frac{\partial f_2}{\partial X_N} \\ \frac{\partial f_N}{\partial X_1} & \frac{\partial f_N}{\partial X_2} & \cdots & \frac{\partial f_N}{\partial X_N} \end{bmatrix}$$

3. Repeat the above procedure using, as improved guesses, $$\widetilde{X}^1 = \widetilde{X}^0 + d\widetilde{X}$$

until (3) is satisfied to the desired degree of accuracy. This process is a trial and error method. In case of divergence, or physically meaningless results, it is necessary to start with another initial guess. If the calculated stp size is too large, it is also necessary to readjust the step size properly for better convergence.

If the set of nonlinear equations has zero solutions, the above algorithm is useful to solve it. However, in many cases there are no zero solutions. For an example, if the numbers of independent variables are not equal to the numbers of nonlinar objective functions, the zero solution cannot be found. In such case, sometimes it is useful to seek the minimum point of the linear equations. By modifying the aforementioned algorithm for the zero solution, the minimum point can be found. If the initial guess is pretty far from the minimum point, the zero solution algorithm converges quickly. However, if it approaches to the minimum point, it oscillates around that point, or sometimes it jumps far and goes to the other direction. In order to make it converge to the minimum point, total error should be observed and the step should be adjusted around that point. To do this, one more additional error function is defined from relation (30) as follows:

$$E = f_1^2 + f_2^2 + \ldots + f_N^2. \quad (35)$$

The steps involved in such modified algorithm are as follows:
1. Guess a set of initial values given by (30).
2. Calculate error $E_1$ from (35) for $\bar{X}^0$.
3. Calculate an improved guess $\bar{X}^1$ from the zero solution algorithm described in previous section.
4. Calculate $E_2$ from (30) for $\bar{X}^1$.
5. If $E_2 \leq E_1$, then repeat above procedure by replacing $\bar{X}^0$ to $\bar{X}^1$.
6. If $E_2 > E_1$, then compare $\epsilon (= E_2 - E_1)$ with the predetermined desired degree of accuracy. If it is satisfied, the minimum point is reached.
7. If $\epsilon$ is still large, reduce step size $d\bar{X}$, calculate $\bar{X}^1$ again from (34) and go to step 4.

In Appendix A, a subroutine program written in FORTRAN is provided under the subroutine identification MINP.

In the case of an AC motor driven by the UFC, when minimizing the rms harmonic current after filtering, constant flux operation of the motor is assumed, that is, $$V_o/f_o = \text{constant}. \quad (36)$$

If we denote r as the normalized ratio of the output voltage, then r becomes for the constant flux operation:

$$r = V_o/V_b = f_o/f_b \quad (37)$$

where $V_b$ and $f_b$ are the base voltage and the base frequency, respectively. For convenience, $V_b = 3/\pi \, V_{LL}$ and $f_b = f_I$ in equations (17) and (18).

The optimization of the input extrabasal current including the input filter is performed for type A modulation of UFC. The input filter used in this case is as shown in FIGS. 16 and 16A. The objective functions for the double, triple and quadruple modulations are given for the symmetrical modulations and for the same widths of the pulses, are as follows:

1. Double PWM UFC

Figure 17:
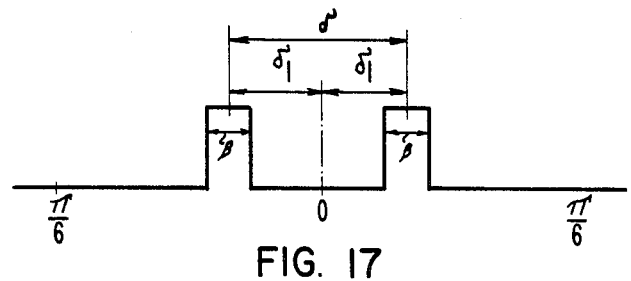
FIG. 17 illustrates the two pulses of a double-pulse PWM UFC system with two independent variables $\beta$ and $\delta$.

From relations (17), (29), (36) and (37), it is seen that the two objective functions with two independent variables are defined for M=2 as follows:

$$f_1 = \left( 4 \sin \frac{\beta}{2} \cos \delta_1 \right)^2 - r^2 \quad (38)$$

$$f_2 = \left( \frac{4}{5} |\bar{A}_I\{5 + 6r)\omega_1\}| \sin \left( \frac{5\beta}{2} \right) \cos(5\delta_1) \right)^2 + \left( \frac{4}{7} |\bar{A}_I\{7 + 6r)\omega_1\}| \sin \left( \frac{7\beta}{2} \right) \cos(7\delta_1) \right)^2 \quad (39)$$

and $\delta = 2\delta_1$. The existence function for this case is shown in FIG. 17.

Equation (38) defines control of the fundamental component from 0 to full range by varying r, while equation (39) defines minimizing the square sum of the 5th and 7th components as r increases from 0.

2. Triple PWM UFC

In this case M=3 and the objective functions are defined as $$f_1 = \left( 2 \sin \frac{\beta}{2} + 4 \sin \frac{\beta}{2} \cos \delta \right)^2 - r^2 \quad (40)$$

$$f_2 = \quad (41)$$
$$\left( \frac{2}{5} |\bar{A}_I\{(5 + 6r)\omega_1 I\}| \cdot \sin \left( \frac{5\beta}{2} \right) \cdot \{1 + 2\cos(5\delta)\} \right)^2 +$$
$$\left( \frac{2}{7} |\bar{A}_I\{(7 + 6r)\omega_1 I\}| \cdot \sin \left( \frac{7\beta}{2} \right) \cdot \{1 + 2\cos(7\delta)\} \right)^2 +$$
$$\left( \frac{2}{11} |\bar{A}_I\{(11 + 12r)\omega_1 I\}| \cdot \sin \left( \frac{11\beta}{2} \right) \cdot \{1 + 2\cos(11\delta)\} \right)^2 +$$
$$\left( \frac{2}{13} |\bar{A}_I\{(13 + 12r)\omega_1 I\}| \cdot \sin \left( \frac{13\beta}{2} \right) \cdot \{1 + 2\cos(13\delta)\} \right)^2$$

Figure 18:
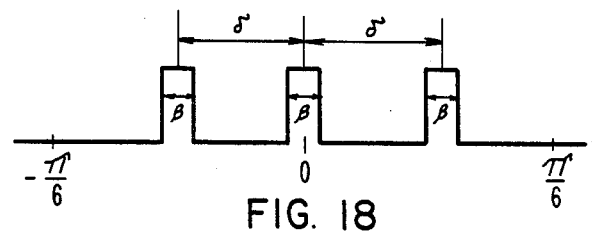
FIG. 18 illustrates the three-pulses of a three-pulse PWM UFC system with two independent variables $\beta$ and $\delta$.

Equation (41) defines control of the 5th, 7th, 11th and 13th components related to the filter characteristic. The existence function in this case is shown in FIG. 18.

3. Quadruple PWM UFC

In this case M=4 the objective functions have three independent variables:

$$f_1 = \left( 4 \sin \frac{\beta}{2} \cos \delta_1 + 4 \sin \frac{\beta}{2} \cos \delta_2 \right)^2 - r^2 \quad (42)$$

$$f_2 = \left( \frac{4}{5} \bar{A}_I\{(5 + 6r)\omega_1 I\} \cdot \quad (43)$$

-continued $$\left. \sin\left(\frac{5\beta}{2}\right) \cdot \{\cos(5\delta_1) + \cos(5\delta_2)\}\right.\right)^2 +$$

$$\left(\frac{4}{7} \overline{A}_I\{(7 + 6r)\omega_1 I\} \cdot \right.$$

$$\left. \sin\left(\frac{7\beta}{2}\right) \cdot \{\cos(7\delta_1) + \cos(7\delta_2)\}\right.\right)^2$$

$$f_3 = \left(\frac{4}{11} \overline{A}_I\{(11 + 12r)\omega_1 I\} \cdot \right. \tag{44}$$

$$\left. \sin\left(\frac{11\beta}{2}\right) \cdot \{\cos(11\delta_1) + \cos(11\delta_2)\}\right.\right)^2 +$$

$$\left(\frac{4}{13} \overline{A}_I\{(13 + 12r)\omega_1 I\} \cdot \right.$$

$$\left. \sin\left(\frac{13\beta}{2}\right) \cdot \{\cos(13\delta_1) + \cos(13\delta_2)\}\right.\right)^2$$

Figure 19:
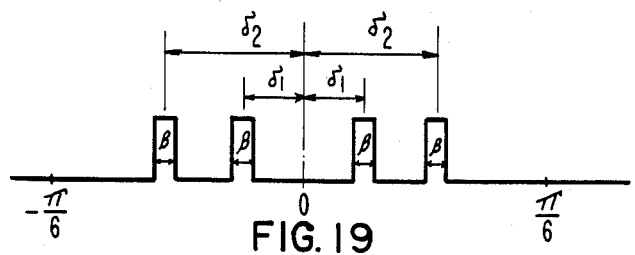
FIG. 19 illustrates the four pulses of a quadruple UFC system with three independent variables $\beta, \delta_1, \delta_2$.

Equation (43) is the function for the 5th and the 7th components, whereas equation (44) relates to the 11th and the 13th components. The existence function in this case is shown in FIG. 19.

Figure 20:
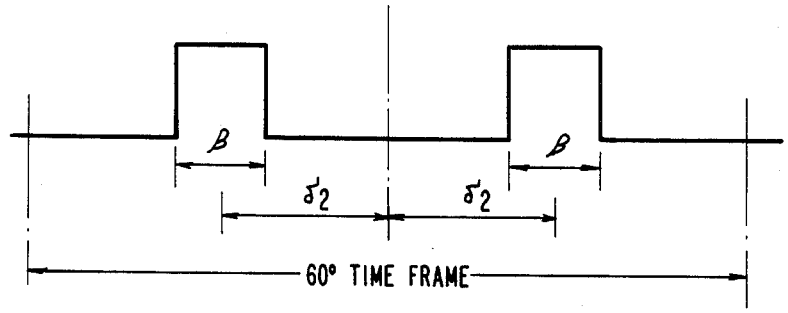
FIG. 20 shows the basic time frame and the conduction and shorting intervals in a "double-pulse" situation.

Reference is now made to FIG. 20 where the conduction intervals $t_1^*$ (logic "high") and shorting intervals $t_2^*$ (logic "low") are shown within a basic time frame T for a "double-pulse" (two conduction intervals) type of voltage control. The conduction intervals are symmetrically spaced with respect to the center point of time frame T. For convenience, all intervals in FIG. 20 are shown in electrical degrees, instead of actual times, in order to make the relationships independent of the actual output and input frequencies. Thus, the time frame T represents 60 electrical degrees at any output and input frequencies. As explained previously, the relationship between the given input frequency $f_I$, the wanted output frequency $f_0$ and the required time frame T can be expressed as follows: $T = 1/6 \ (f_I + f_O)$. Thus, the actual time corresponding to one electrical degree, at given $f_I$ and $f_O$, can be expressed mathematically as follows: $1° = T/60 = 1/360 \ (f_I + f_O)$. In the double-pulse situation, $\beta$ is the duration in degrees of each of the two active pulses, and $\delta$ is the separation between the axes of the two pulses.

If angle $\delta/2$ is equal to 15°, then, all of the shorting intervals are equal to each other (a shorting interval is equal to $\delta - \beta$, where $\beta$ corresponds to conduction time $t_1^*$ and thus determines the amplitude of the fundamental output voltage). In this case, as explained earlier, the dominant output voltage and input current harmonics having frequencies of $(6f_I + 5f_O)$, $(6f_I + 7f_O)$ and $(6f_O + 5f_I)$, $(6f_O + 7f_I)$, respectively, are reduced but not eliminated. However, if $\delta/2$ is given the specific values of Table I herebelow, then, either of these two, or any other harmonic component can be eliminated totally from the output voltage and input current waves:

TABLE I

| Value of Angle δ/2 | Component Eliminated |
|---|---|
| 18.00° | $6f_I + 5f_O$ (output voltage) |

TABLE I-continued

| Value of Angle δ/2 | Component Eliminated |
|---|---|
| 12.86° | $5f_I + 6f_O$ (input current) |
| | $6f_I + 7f_O$ (output voltage) |
| | $7f_I + 6f_O$ (input current) |
| 8.18° | $12f_I + 11f_O$ (output voltage) |
| | $11f_I + 12f_O$ (input current) |
| 6.92° | $12f_I + 13f_O$ (output voltage) |
| | $13f_I + 12f_O$ (input current) |

The above relationships are used in the control strategy employed with the method according to the invention, thereby to reduce significantly the size of the input filter required for the UFC.

Figure 21:
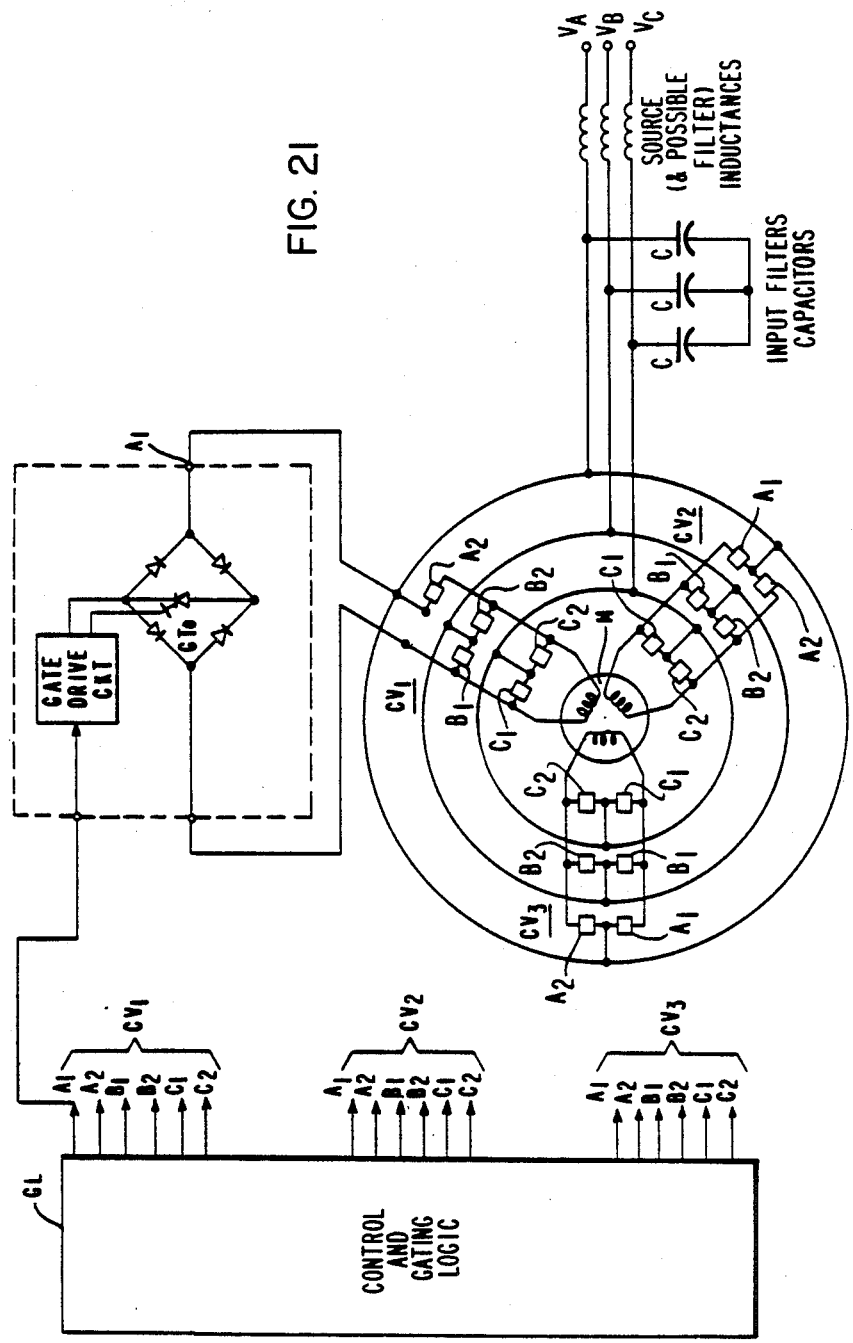
FIG. 21 shows the basic UFC converter with an input filter coupled thereto.

This control strategy for the UFC, as applied to a "double pulse" type of control, can be explained by reference to FIG. 21, where the basic UFC power converter is shown, as generally known, to have associated thereto an input filter consisting of a shunt capacitor C and a series inductor L in each phase. The inductor L can be the impedance of the source itself.

As earlier stated, in practice a low pass input filter is needed to limit the voltage transients at the input terminals, and across the converter power switches, by providing a low impedance path for the input current harmonics of the UFC. Such low pass LC input filter exhibits a resonance at the frequency determined by the value of L and C according to the expression $f_r = 1/(2\pi\sqrt{LC})$. From a economic standpoint, L and C should be as small as possible. The minimum value of inductance L is usually given by the available AC power source. The value and, thus, the size of C, are determined by design criteria, among which the most important is the limit for the input current distortion allowed. The resonance of the LC input filter can very much increase the input current distortion and, thereby affect the terminal voltage to the same extent.

Figure 22:
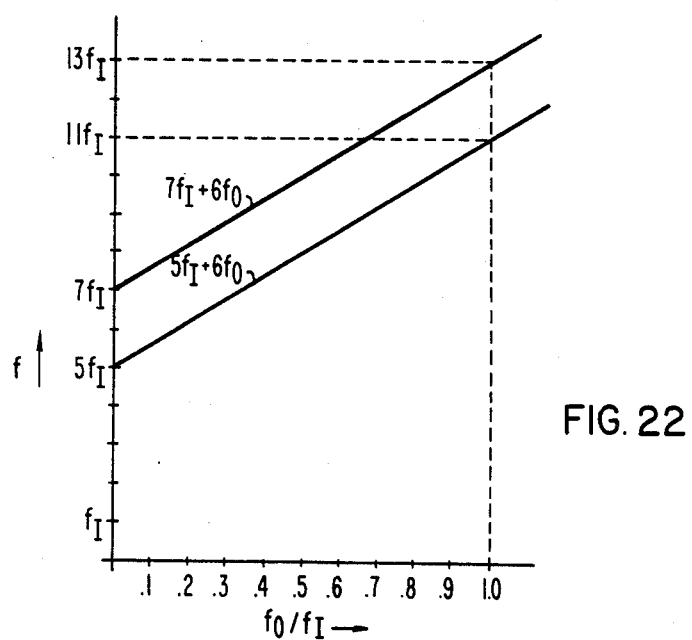
FIG. 22 illustrates the frequency variation of the two most significant input current harmonics against the normalized output frequency $f_O/f_r$.

Referring to FIG. 22, the frequency variation for the two most significant input current harmonics, mainly with frequencies of $(5f_I + 6f_O)$ and $(7f_I + 6f_O)$, is shown against the normalized output frequency $f_O/f_I$. It can be seen that, as the output frequency is increased from $f_O = 0$ to $f_O = f_I$, the frequencies of those two harmonics increase from $5f_I$ to $11f_I$ and from $7f_I$ to $13f_I$, respectively. Therefore, in order to avoid resonant amplification of both of these harmonics, the cut-off (resonant) frequency of the LC input filter in the prior art UFC must be lower than $5f_I$. Typically, it is chosen to be $4f_I$. With a given L (usually the supply inductance), the minimum capacitor required can be determined with the selected cut-off frequency $(f_r = 4f_I)$ as follows:

$$C = \frac{1}{4\pi^2(4f_r)^2 L}$$

In order to use a smaller capacitor (which would mean higher filter resonant frequency) without any significant increase in the input current distortion, the amplitudes of the input current harmonics must be close to zero at frequencies for which harmonic amplification is taking place, due to the resonance of the input filter. Since in motor drive applications, which are a major field of application of the UFC, the output voltage is varied substantially in direct proportion to the output frequency (so as to keep the airgap flux in the motor constant), selected harmonic elimination in the input current is possible in the normal course of output voltage control by appropriately establishing locations within the basic time frame T for the conduction intervals in accordance with a judicious selection of the control angle δ, as indicated earlier in Table I. Indeed, angle δ can be controlled so that the rms distortion of the current, drawn from the AC source by the UFC with the input filter, remains minimum when the output frequency and voltage are being varied.

The optimum values of angle δ, to obtain minimum input supply current distortions, have been calculated over the output frequency range of zero to $f_I$ ($0 \leq f_O \leq f_I$) for an input filter having a cut-off (resonant) frequency of $f_r = 6f_I$ and a quality factor of $Q = 10$. An even multiple of the input supply frequency is chosen for the filter cut-off frequency, because even harmonics are normally absent in the AC supply so that the input filter is not significantly burdened by the odd supply harmonics. With a cut-off frequency of $6f_I$, and the same value of L, the capacitance value and, thus, the size of the capacitor are reduced by a factor of $1-(4f_I/6f_I)^2 = (1-4/9)$ or by 56%.

Figure 23:
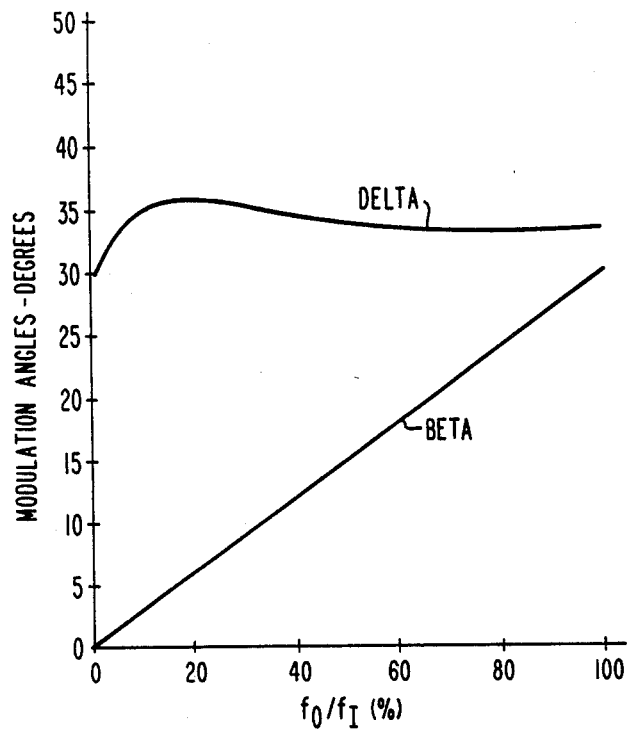
FIG. 23 shows the variations of the angles $\delta$ and $\beta$ against the normalized output frequency.
Figure 24:
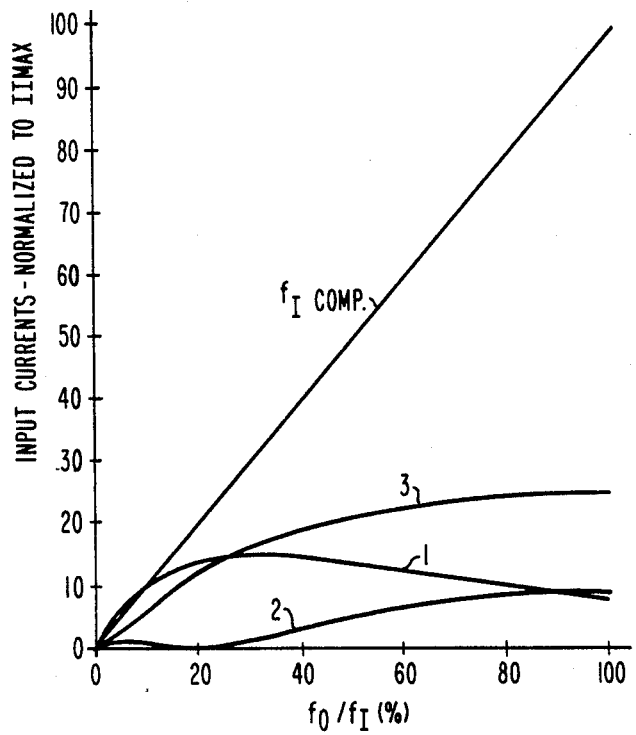
FIG. 24 is a chart of curves showing the variation of the two most significant amplitudes of the UFC input current components, and the r.m.s. sum of these components drawn from the AC supply via the input filter, against the normalized output frequency in percent.

The results of the optimization process carried out to determine the values of angle δ require to keep the input current distortion of the UFC with the input filter at a minimum as the output frequency is varied from zero to $f_I$. These results are shown in FIGS. 23 and 24. As explained earlier, the output voltage is assumed to vary in proportion with the output frequency.

In FIG. 23, the variations of angles δ (DELTA) and β (BETA) are shown against the normalized output frequency $f_O/f_I$. As can be seen, at, and in the vicinity of, $f_O/f_I = 0.166$, that is, where $f_O = 0.166 \times f_I$, the angle δ becomes 36 degrees. At this value of δ (i.e., $δ/2 = 18°$) the current harmonic with the frequency of $5f_I + 6f_O$ becomes zero (refer to Table I). This is necessary to avoid resonant amplification since at $f_O/f_I = 0.166$, the frequency of $5f_I + 6f_O = 5f_I + 6 \times 0.166 f_I$ coincides with $6f_I$ the resonant frequency of the input filter.

Figure 25:
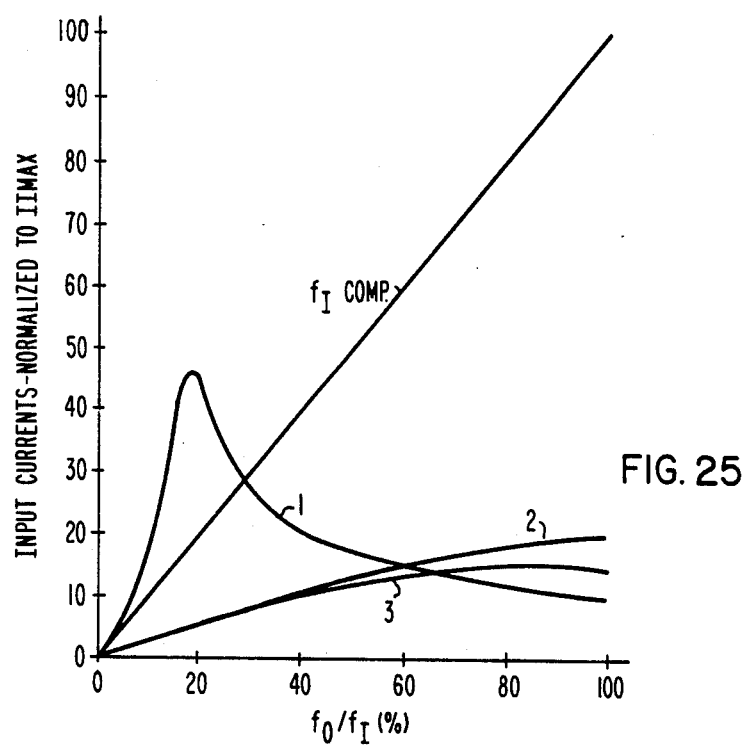
FIG. 25 shows the same input current components for the case where $\delta = 30°$, e.g., for equal shorting intervals.

In FIG. 24, are shown the variations of the amplitude of the UFC input current components with frequencies of $5f_I + 6f_O$ and $7f_I + 6f_O$, together with the rms sum of these components drawn from the AC supply via the input filter. In FIGS. 23 and 24: curve (1) represents the filtered rims of the 5th and the 7th components; curve (2) is the unfiltered components of ($5f_I + 6f_O$) while curve (3) is the unfiltered component of ($7f_I + 6f_O$). It is observed that the component $5f_I + 6f_o$ does indeed become zero in the vicinity of $f_O/f_I = 0.17$ and thus the rms distortion does not increase significantly at the resonant frequency of the input filter. By comparison, FIG. 25 shows the same current components under identical operating conditions for the case of frequency angle δ equal to 30 degrees ($δ/2 = 15°$). As earlier stated, this value of δ results in equal shorting intervals, i.e., equally spaced conduction intervals. The large resonant amplification of the component with frequency $5f_I + 6f_O$ and the correspondingly large input supply current distortion, are visible from curve (1) in FIG. 25.

Figure 26:
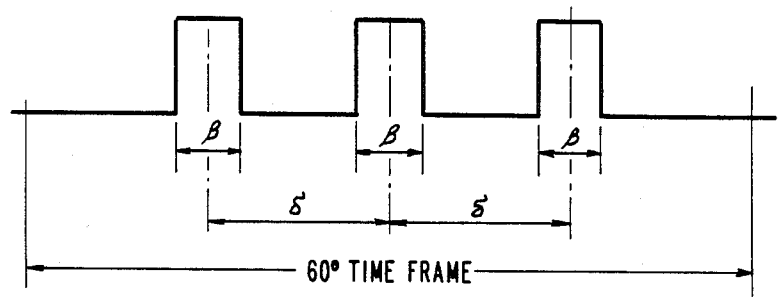
FIG. 26 shows the basic time frame and the conduction and shorting intervals in a "triple-pulse" situation.

It is proposed to apply the technique minimizing of the input current distortion by controlling the position of the conduction intervals within the basic time frame T with an increased number of conduction intervals. FIG. 26 shows the "triple-pulse" situation (three conduction intervals of duration β within a time frame T of 60°) and FIG. 27 the "quadruple-pulse" situation (four conduction intervals of duration β within a time frame T of 60°) (δ defines the distance of the outer pulse axis from the center pulse axis in the three-pulse case; $δ_1$ and $δ_2$ define the distances of the inner and outer pulses from the central axis, in the four-pulse case).

Specific values of angle δ which result in zero amplitude for one of the dominant output voltage and input current harmonics are shown in Table II herebelow for the "triple-pulse" pattern, and specific values of angles $δ_1$ and $δ_2$ (those angles defining the distance to the mirror-image axis of the inner and outer pulse axes, respectively) are shown in Table III for the "quadruple-pulse" pattern.

TABLE II

| Value of Angle δ/2 | Component Eliminated |
| --- | --- |
| 24.00° | $6f_I + 5f_O$ (output voltage) |
|  | $5f_I + 6f_O$ (input current) |
| 17.14° | $6f_I + 7f_O$ (output voltage) |
|  | $7f_I + 6f_O$ (input current) |

TABLE III

| Value of $δ_1$ | Value of $δ_2$ | Component Eliminated |
| --- | --- | --- |
| 9.25° | 26.60° | $6F_I + 5f_O$ (output voltage) |
|  |  | $5f_I + 6f_O$ (input current) |
| 4.34° | 21.91° | $6f_I + 7f_O$ (output voltage) |
|  |  | $7f_I + 6f_O$ (input current) |

Figure 28:
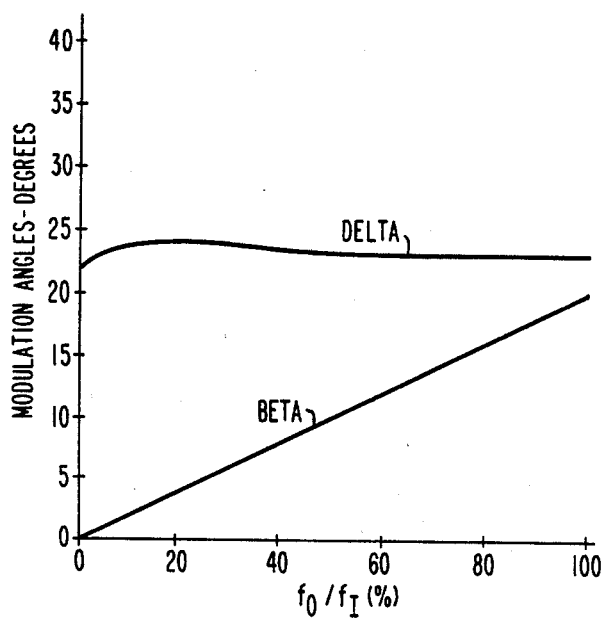
FIG. 28 illustrates the variation of $\delta$, and $\beta$, and FIG. 29 the input current components for the "triple-pulse" mode of FIG. 26.
Figure 29:
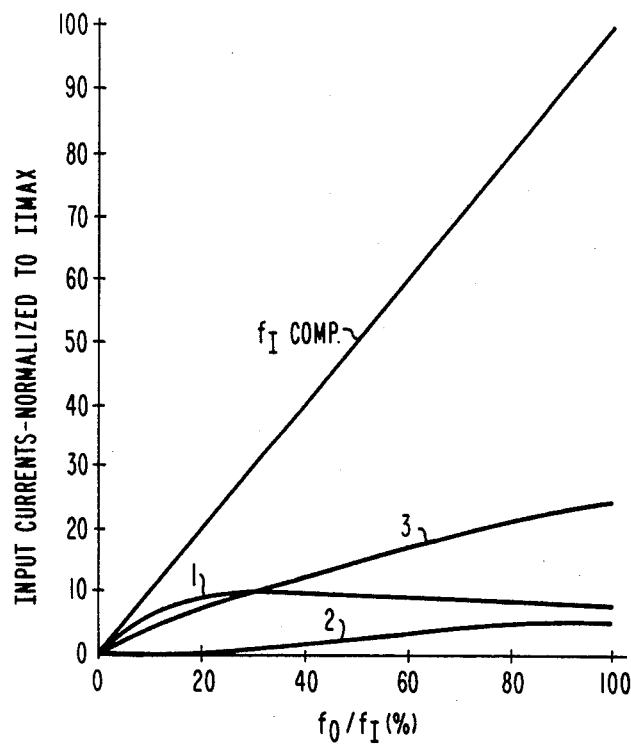

The variations of angle δ required for minimum input current distortion with the "triple-pulse" pattern of FIG. 26 are illustrated in FIG. 28 for the previously defined input filter ($f_r/f_I = 6$, $Q = 10$). The corresponding input current components and minimized supply current distortion are shown in FIG. 29.

Figure 27:
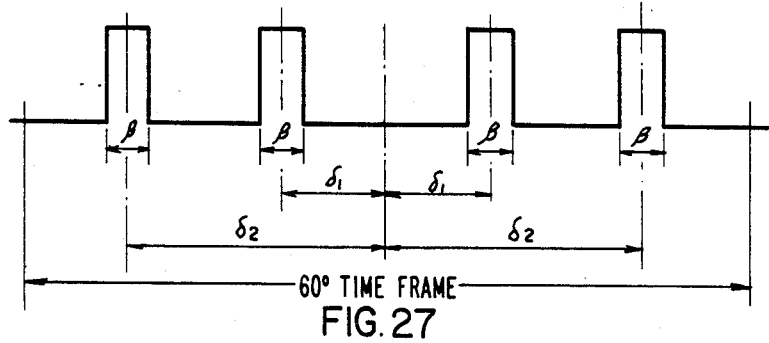
FIG. 27 is analogous to FIG. 26, in the "quadruple-pulse" situation.
Figure 30:
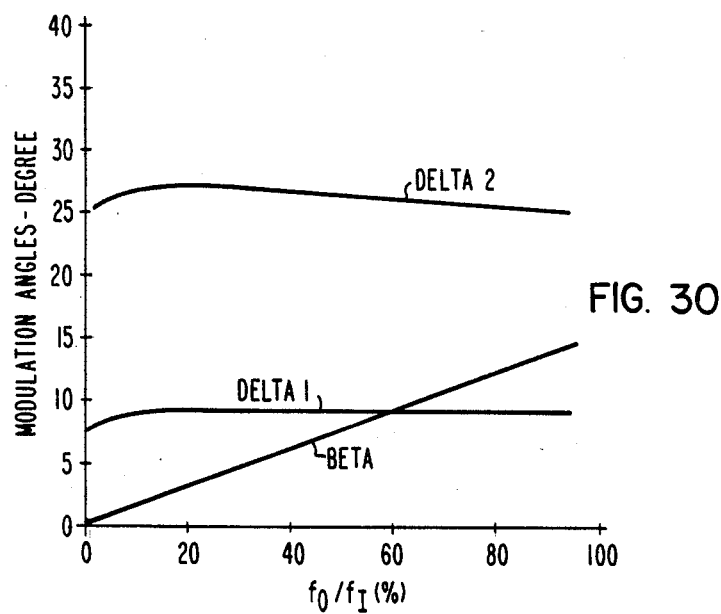
FIGS. 30 and 31 correspond to FIGS. 28 and 29 in the "quadruple-pulse" mode of FIG. 27, respectively.
Figure 31:
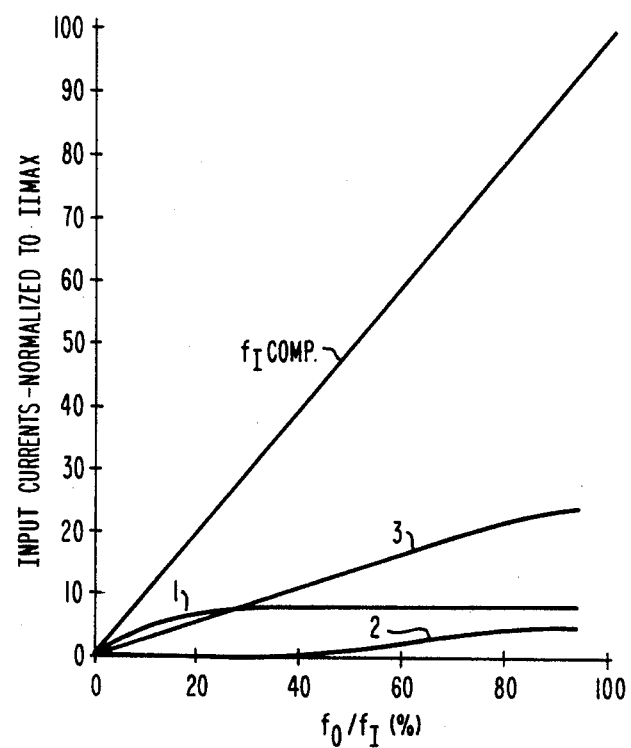

The variations of angles $δ_1$ and $δ_2$ required for minimum input current distortion with the "quadruple-pulse" pattern of FIG. 27 are shown in FIG. 30. The relevant input current components and minimized supply current distortion are shown in FIG. 31.

It is clear that the angles ($δ_1$ and $δ_2$) determining the location of the conduction intervals in the basic time frame can be controlled so as to optimize the input supply current distortion and meet different requirements while accommodating different input filter characteristics.

As disclosed in the prior art, and illustrated in FIG. 7, when effecting AC motor speed control, the relative length of time interval $t_1$ decreases and that of $t_2$ increases, within the time frame T, which also increases as the output frequency of the UFC is decreased, in order to keep the output frequency to voltage ratio, thereby to maintain the airgap flux in the motor approximately constant. As earlier explained with the prior art UFC, increasing the time duration T, and decreasing the time interval ratio $t_1/t_2$ result in significantly increased ripple both in the motor and input supply currents at relatively low output frequencies. On the other hand, at relatively high output frequencies, for which the fundamental output voltage is close to its maximum value, time interval $t_1$ becomes longer than $t_2$, so that voltage control no longer has any significant effect on the ripple of the output and input currents.

Applying the voltage control method in the context of the invention, since the basic time frame T is subdivided into n subtime frames T* (each with a $t_1$* and a $t_2$* interval during which load is either connected to the AC input supply or it is shorted) the switching rate of the power devices in the UFC is increased n times. In a practical UFC motor drive system, the output frequency may be controlled typically in the range of zero to 2 times the input frequency. This would require to vary the basic time frame T e.g. $T=1/6(f_I+f_O)$ from $T=1/(6f_I)$ (zero output frequency) to $T=1/(18f_I)$. In other words, the length of T at the maximum output frequency ($f_{O\ max}=2f_I$) is one-third of that at the minimum output frequency ($f_{O\ min}=0$). This means that the switching rate of the power devices increases by a factor of three at the maximum output frequency.

Taking into account the fact that earlier and more conventional UFC voltage control has an adverse effect on the output and input current ripples primarily at relatively low output frequencies, and that the switching rate of the power devices in a UFC cannot be made arbitrarily high for practical reasons (for example, switching losses), it is concluded that a voltage control method in which the number, n, of subtime frames, $T^*$, is varied with the length of time frame T, provides the best practical solution. With this arrangement, both the output/input current ripple and the switching rate of the power devices in the UFC can be kept within reasonable limits over the total output frequency range.

To summarize with the latter method of UFC output voltage control, the basic time frames T, during which the input supply voltages are in sequence connected to the output, are subdivided into n (where n is an integer number greater than one) subtime frames $T^*$.

$$\left(\sum_{k=1}^{n} T_k^* = T\right)$$

Each subtime frame $T^*$ is further divided into two time intervals $t_1^*$ and $t_2^*$. During time intervals $t_1^*$, within a given time frame T, the load is connected to the same phase of the input voltage by the UFC power switches. During time intervals $t_2^*$, the output is disconnected from the input supply and the load is shorted by the UFC power switches. The amplitude of the fundamental output voltage is approximately proportional to the ratio:

$$\sum_{k=1}^{n} t_{k1}^*/T.$$

The number of subtime frames determined by integer n, that is, the number of conduction intervals within the time frame T, is varied as a function of T (n is decreased with increasing T) in such a way that the ratio of:

$$\sum_{k=1}^{n} t_{k1}^*/T,$$

which determines the amplitude of the fundamental output voltage, remains the same at a given T independently of n. This advantage is added to the advantage due to the invention where the *locations* of the conduction intervals are changed within the basic time frame, as the output frequency is varied, in such a way that the distortion of the current drawn by the UFC from the AC supply is *minimized*.

This technique, namely by control of the locations of the conduction intervals within the basic time frame, can be used also to eliminate some of the harmonic components from the output voltage wave, or in general, to minimize the output distortion according to some given criterion.

Figure 32:
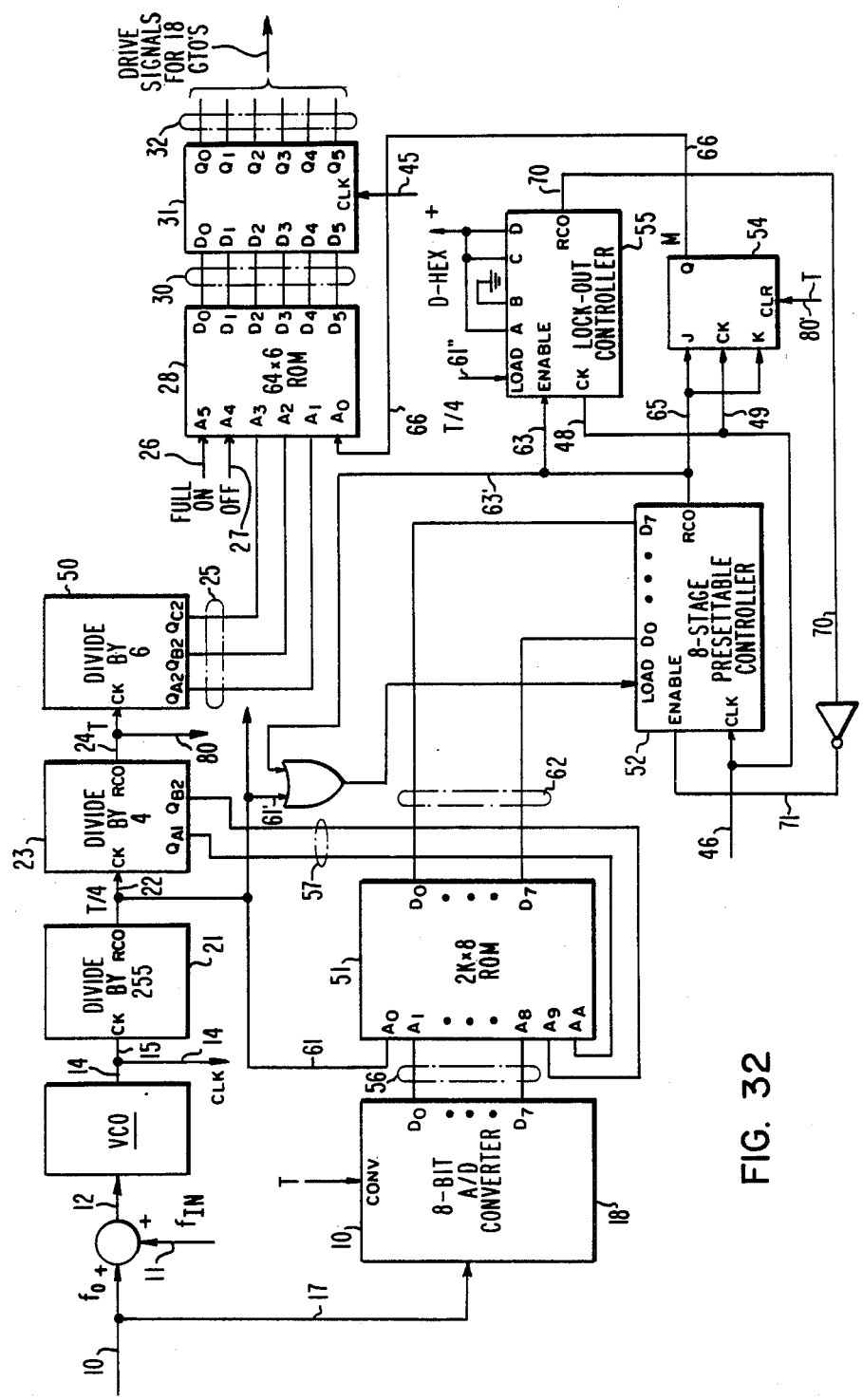
FIG. 32 shows in block diagram one mode of implementation of control apparatus according to the invention for a UFC with minimum input line current distortion.

FIG. 32 is a block diagram showing a digital control circuit according to the invention which generates GTO drive signals from distributor 28 on lines 32 to the 18 GRO's of the UFC converter so as to implement the previously described UFC control strategy.

Figure 33:
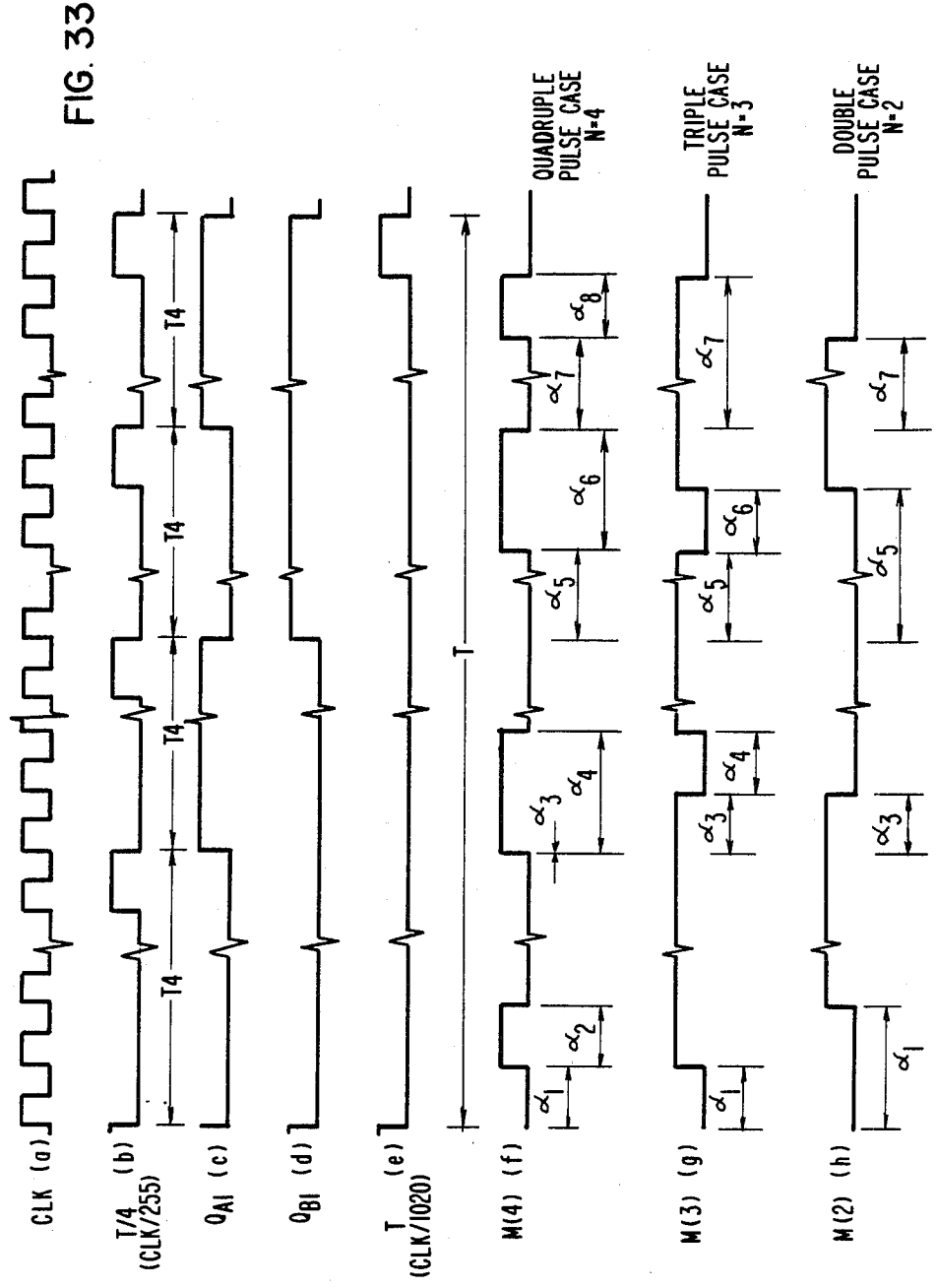
FIG. 33 illustrates with curves the operation of the circuit of FIG. 32 while providing illustration of quadruple, triple and double pulse implementation.

FIG. 33 shows under (f) how the four pulses in a quadruple-pulse situation are generated, each within a fourth of the basic time period T in order to provide with counts ($\alpha_1$, $\alpha_2$) for the first pulse, ($\alpha_3$, $\alpha_4$) for the second, ($\alpha_5$, $\alpha_6$) for the third and ($\alpha_7$, $\alpha_8$) for the fourth pulse a distributed occurrence, like in FIG. 27 of proper width ($\alpha_2$, $\alpha_4$, $\alpha_6$, $\alpha_8$ respectively) and proper occurrence ($\alpha_1$, $\alpha_3$, $\alpha_5$ and $\alpha_7$). Similarly under (g) in a three-pulse situation, from T/4 are defined the occurrences of the front and tail edge ($\alpha_1$, $\alpha_3$) of one pulse, of the second pulse ($\alpha_3+\alpha_4$ and $\alpha_5$), of the third pulse ($\alpha_5+\alpha_6$ and $\alpha_7$), thus defining the location and the width.

Finally under (h) from T/4 are defined the occurrence of the front edge ($\alpha_1$ and $\alpha_5$ for the respective pulses) and the occurrence of the tail edge ($\alpha_3$ and $\alpha_7$ for the respective pulses) in a two-pulse situation, thereby defining location and width of the two pulses.

Referring again to FIG. 32, the desired output frequency, $f_O$ of line 10 and the input frequency, $f_{IN}$ of line 11 are summed as analog quantities and the sum of line 12 is converted into a pulse train on line 14 of frequency 6120* ($f_O$)+$f_{IN}$) by a voltage-controlled oscillator (VCO). This step could also be done digitally if desired by programming counters with digital numbers. The output frequency, $f_O$ of line 10, is also used to specify on line 17 the desired output voltage $V_O$, so that $V_O/f_O$ is maintained constant as generally done in an AC motor drive, although, as will be described later, such $V_O/f_O$ ratio may be altered to provide a voltage "boost" at low frequencies. The VCO output pulse train of line 14 serves as the control circuit clock to provide synchronous operation of all subsequent operations. Thus, from line 14 by line 46 to presettable counter 52, by line 48 to lock-out counter 55, line 49 to flip-flop 54, and by line 45 to latching device 31 buffering distributor 28 of the drive signals of line 32. The clock signal is by line 15 and programmable counter 21 divided in sequence by 255, then by divider 23 it is divided by 4 and by divider 50 it is divided by 6. The input pulse train of line 15 ultimately produces on lines 25 the required ($f_{OUT}+f_{IN}$) control signals from pins $Q_{A2}$, $Q_{B2}$, and $Q_{C2}$ of device 50. The input pulse train of line 24 to the divide-by-six counter 50 is the period T of the basic UFC switching interval. The input pulse train of line 22 to the divide-by-four counter 23 has the period T/4, namely the interval associated with the quadruple-pulse modulation mode. The input pulse train of line 15 to the divide by 255 counter 21 has a period which corresponds to T/1020, or 360/6120 electrical degrees of the ($f_{OUT}+f_{IN}$) switching frequency. Therefore, each clock pulse from the VCO represents 0.059 electrical degrees of the switching frequency and, for this embodiment of the control circuit, it represents the resolution to which any pulse width, or pulse position, can be specified.

The desired output voltage $V_O$, of line 17 is converted by an A/D converter 10 into an eight-bit digital value at pins $D_0$-$D_7$ which is concatenated with the subinterval T/4 from line 22 and line 61 to address pin $A_O$ of ROM 51 to address a look-up table stored in the 2K by 8 wide ROM device. Pins $D_0$-$D_7$ define by lines 56 the address pins $A_1$-$A_8$ for the ROM. This ROM sequentially outputs on output pins $D_0$-$D_7$ and line 62 values which are appropriate to each of the T/4 intervals, as inputs $D_0$-$D_7$ to a presettable eight-bit counter 52. Counter 52 can also reload itself via lines 22, 61, 61' on OR device and line 53 *once* within each T/4 interval.

Referring now to FIG. 33, the clock pulses of line 14, the basic subintervals T/4 of lines 57 as defined by $Q_{A1}$ and $Q_{B1}$ and the status of $Q_{A1}$, $Q_{B1}$ are shown under (a), (b), (c) and (d), respectively. Also shown are the basic UFC switching frequency, T, under (e) and three examples of the signal M of line 66 for the quadruple under (f), triple under (g) and double pulse under (h) cases, respectively. Not shown is the single pulse case which can easily be conceived from the preceding cases.

Referring concurrently to FIGS. 32 and 33 and illustratively to the quadruple-pulse case, at the first T/4 interval defined by $Q_{A1}=Q_{B1}=\phi$, a preset value corresponding to the time interval $\alpha_1$ representing pulse location within the time frame T is loaded into counter 52. Counter 52 is loaded synchronously when the T/4 pulse is high with a value which is given by $(255-\alpha_1)$ It is the equivalent pulse count of desired angular position divided by 0.059 and rounded to the nearest integer value. After counter 52 has received $\alpha_1$ clock pulses a carry out is generated by line 65 which causes the J-K flip flop 54 to toggle. Since flip flop 54 was cleared to zero by line 80' at the beginning of the interval T, the M signal of line 66 becomes positive for the duration $\alpha_1$. Counter 52 also reloads itself with the next value, $(255-\alpha_2)$, which defines the pulse-width. This value is pointed to via lines 62 by the ROM addressed at the next contiguous locations, due to T/4 on line 61 now being a logical low. The M signal, then, is positive for the pulse duration of $\alpha_2$ counts, until it toggles low. The presettable counter 52 now will remain quiescent for the remainder of the T/4 subinterval, due to a disabling signal via lines 70, 71 (the latter over an inverter) generated by a lock-out counter 54. At the next subinterval T/4, by line 61" the lock-out counter 55 is set to a value of $D_{16}$ to allow the presettable counter 52 to operate and set and/or reset the M signal of line 66 as desired, e.g. for the $\alpha_3$ location value and the $\alpha_4$ pulse-width value, for the subsequent pulse.

At subsequent T/4 subintervals, the M signal is toggled by flip flop 54 and counter 52 is loaded with corresponding $\alpha$'s as necessary to generate the required M signal in a manner identical to that just described. At the end of the T interval, by lines 24, 80, 80', the J-K flip flop 54 is cleared so that a new T interval may be begun, and by line 80" the A/D converter 18 is allowed to present its new value of $V_O$ at this time as well.

The presettable counter 52 may be loaded with $\phi\phi$, in which case 256 pulses will be required to toggle the M signal. Since only 255 pulses are available in each T/4 subinterval, it is possible to delete one, or both, edge transitions of the M signal, if desired within any subinterval. This is required for operation in the triple, double, and single pulse modes. For a triple-pulse situation, for the example shown, the $\alpha_2$ and $\alpha_8$ transitions are deleted by loading the counter with $\phi\phi$ in the appropriate ROM locations of device 51. For the double-pulse situation $\alpha_2$, $\alpha_4$, $\alpha_6$, and $\alpha_8$ transitions are deleted.

The M signal of line 66 is associated in ROM device 28 as pin $A_O$ with the $(f_O+f_{IN})$ signals ($Q_{A2}$, $Q_{B2}$ and $Q_{C2}$) of pins $A_1$–$A_3$ (from lines 25) to point to another look-up function of the ROM and generate on lines 30 the command signals which determine the drive signals of lines 32 to the GTO's. The output of ROM 28 is buffered by a latch 31 to eliminate "glitches" caused by the finite access time of the ROM. As shown in FIGS. 6A–6C only six unique drive signals need be generated, since the same signals are used in each phase of the UFC, although with different switch assignments. The 64 by 6 ROM device 28 also has address lines dedicated to the full "on" and off states as prescribed by line 26 in order to provide maximum output voltage and fault protection respectively.

Figure 34:
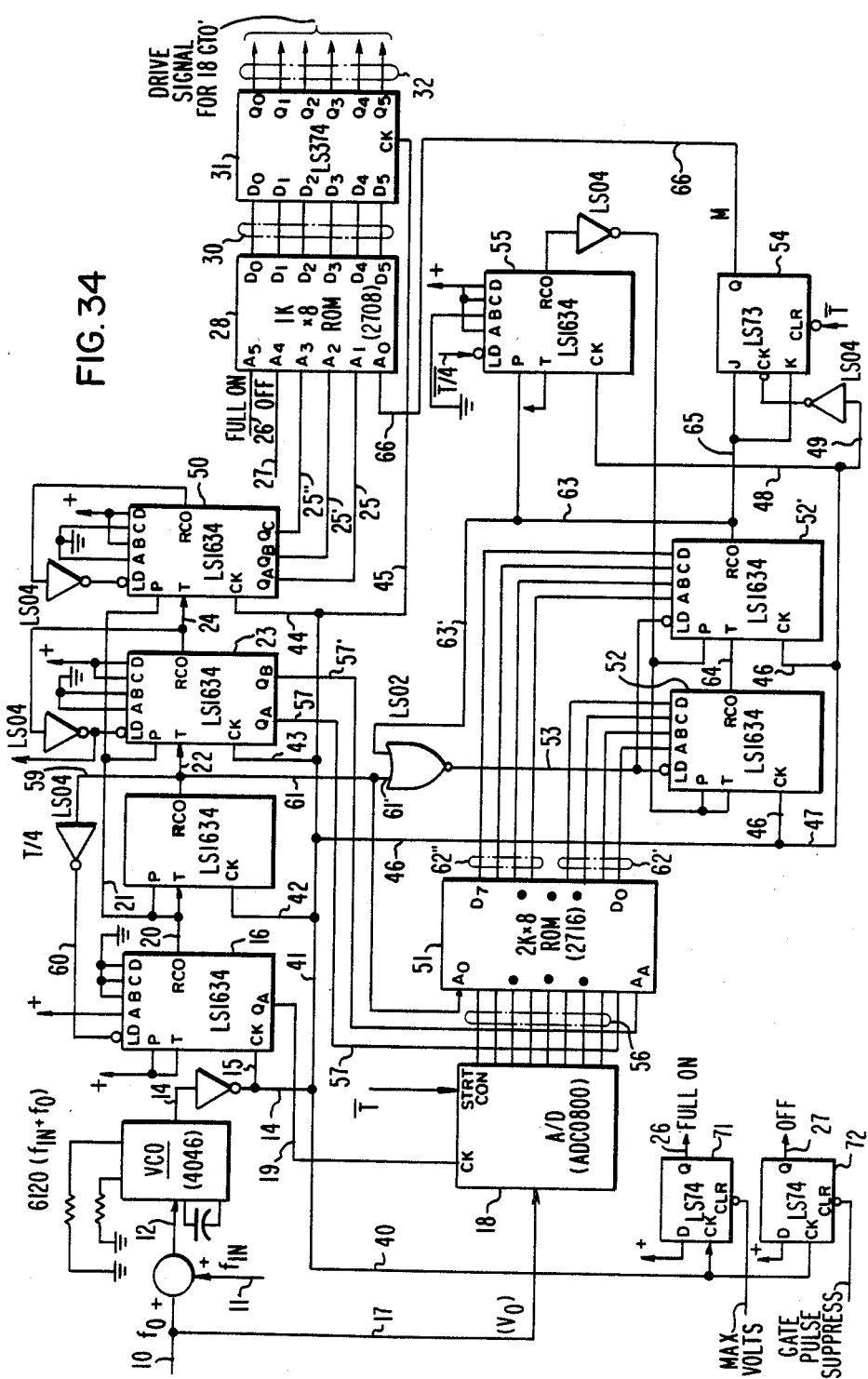
FIG. 34 is a more detailed block diagram for the implementation of control apparatus according to the invention.

FIG. 34 is a block diagram of the UFC control circuit according to the invention in the preferred embodiment thereof.

More specifically, the VCO is a 4046 solid state device. Counters 16, 21, 23 and 50 are LS163A devices. A/D converter 10 is a solid state device known as ADC0800. Device 51 is a 2K×8 ROM of the type 2716. The 8-stage presettable counter 52 is comprised of two identical devices 74LS163A. Lock-out counter 55 is also a 74LS163A device. ROM 28 is a 1K×8 ROM of the type 2708. Latch device 31 is a 74LS374 device.

The full ON and the OFF conditions of lines 26, 27, respectively, into pins $A_5$ and $A_4$ of device 28 are derived from the negative Q outputs of solid state devices 71, 72, respectively which are of the type 74LS74. These are clocked via line 40 and line 14. The maximum volts is applied on the CLR pin of device 71, whereas a gate pulse suppress signal is applied on the CLR pin of device 72.

In Appendix A are grouped the software elements for the calculation of the solutions to the function matrix, the determination of the minimum points and the determination of the objective functions in the double-, triple- and quadruple-pulse situations.

APPENDIX A

1. Main Program - UFDHLF.FOR

2. Subroutine LINQ (A,B,D,N,DET)

Find the solution of a set of linear equations using Gauss Sidal method.

3. Subroutine MINP (X,JMP,N)

Minimum point calculation.

4. Subroutine PR (X,E,PAR,N)

Print the results.

5. Subroutine PLOT (Y,M,NF,NS)
             PLOTM (Y,M,NF,NS)

Plot the results using the line printer.

6. Subroutine DFCN (A,F,X,N)

Calculation of derivative function matrix A.

7. Subroutine FCN (X,F,N,PAR) - Double, Triple, Quadraple
   Objective functions.

```
C      MAIN PROGRAM
C      FILENAME=  " UFDHLF.FOR "
C
C      DEFINITION OF VARIABLES
C        A  = N*N   DERIVATIVE MAT
C        F  = N*1   FUNCTION   MAT
C        X  = N*1   SOLUTION   MAT
C        D  = N*1   INCREMENT  MAT
C        DM = REFERENCE STEP SIZE
C        BXL = LOWEST BOUNDARY OF X
C        BXH = HIGHEST BOUNDARY OF X
C        R7  = % OF 7TH HARMONICS
C
       INTEGER    N
       DIMENSION  A(20,20),X(20),X0(20),D(20)
       DIMENSION  F(20),PAR(2),TD(3,50),TA(1,50),TB(2,50)
       COMMON     /DAT/ PI, H(5)
       COMMON     /CHK/ A,D,F,NC,NB,ES
       COMMON     /AAA/ X0,PAR,DM,E
       COMMON     /DFF/ DX,R
       COMMON     /SCALE/ KP,FS(10),HS(5)
       COMMON     /FLT/ W0,Q,AP(5)
       COMMON     /IPR/ IP
       DATA       PI,H/3.1415926,1.,5.,7.,11.,13./
C
       WRITE(6,100)
 100   FORMAT(//T10,'HARMONIC MINIMIZATION OF FILTERED PWM UFC'/
      * T10,'6-PULSE DOUBLE MODULATION CASE')
C
       TYPE *,'     IND VARI N = ?'
       ACCEPT 4, N
 4     FORMAT(I2)
       TYPE *,'                         ',N
       TYPE *,'     FILTER  W0 = ?'
       ACCEPT 8, W0
       TYPE *,'                         ',W0
       TYPE *,'     FILTER  Q  = ?'
       ACCEPT 8, Q
       TYPE *,'                         ',Q
       N1    = N-1
       N2    = N-2
       ITMAX = 1200
       BXL   = -PI/10.
       BXH   = 80.*PI/180.
       DM    = PI/180.
       DX    = 0.01*PI/180.
       NC    = 1
       KP    = 0
C
C      INITIAL VALUES OF X MAT
       DO 5 I=1,N
       WRITE(6,7) I
```

```
            ACCEPT 8, X(I)
            WRITE(6,9) X(I)
            X(I)= X(I)*PI/180.
      5     X0(I)= X(I)
      7     FORMAT(/T5,10HINITIAL X(,I1,6H) = ? )
      8     FORMAT(F9.2)
      9     FORMAT(/T25,F6.2)
C
            ES = 1.E-10
            E  = 1.
            R  = 0.02
            DR = 0.02
C
            DO 10 II=1,50           ! CHANGE R VALUES
            PAR(1) = R
C
            DO 20 I=1,ITMAX
            IF(I.EQ.1) CALL FCN(X,F,N,PAR)    ! CAL  F(X)  MAT
            CALL DFCN(A,F,X,N)                ! CAL  A    MAT
            CALL LINQ(A,F,D,N,DET)            ! GET INC D MAT
C
            CALL MINP(X,JMP,N)
            IF(NC.GT.0) CALL PR(X,E,PAR,N)    !PRINT FOR CHECKING
            IF(JMP.EQ.1) GO TO 50
            IF(E.LT.ES) GO TO 50
     20     CONTINUE
C
C           PRINT FOR VIOLATION
            WRITE(6,200)
    200     FORMAT(/' *** FAIL TO CONVERGE'/T5,'INCREASE ITMAX
          * OR '/T5,'GUESS NEW INITIAL VALUES')
     36     NB=1
            CALL PR(X,E,PAR,N)
            STOP
C
C           CALCULATE FOR THE OTHER R VALUES
     50     IF(KP.NE.1) GO TO 60
            DO 55 J=1,N
     55     FS(J)= 2.*SQRT(ABS(F(J)))/(HS(J)*H(J))
     60     IP= 0
            IF((II/10 - (II-1)/10).EQ.1) IP= 1
            IF(IP.EQ.1) CALL PR(X,E,PAR,N)
            DO 70 J=1,5
     70     AP(J)= SQRT( ABS(AP(J)) )
            AP(1)= 2.*AP(1)
            AP(4)= 2.*AP(4)
            AP(5)= 2.*AP(5)
            IF(IP.EQ.1) WRITE(6,300) AP
    300     FORMAT(/' MAT  AP'/T5,5E12.5)
C
            F(1)= 2.*SQRT( ABS(F(1) - (R/2.)**2) )
            F(2)= 2.*SQRT( ABS(F(2)) )
            IF(IP.EQ.1) WRITE(6,310) (F(J),J=1,2)
    310     FORMAT(/' AMP OF FUND AND RMS HAR(5TH,7TH)'/T5,2E12.5)
C
            R = R + DR
            IF(IP.EQ.1) WRITE(6,330)
    330     FORMAT(//'    ***      ***       ***      ***'//)
C
C           STORE DATA FOR PLOT
            TB(1,II)= 2.*X(1)*180./PI
            TB(2,II)= 2.*X(2)*180./PI
            TD(1,II)= 100.*F(2)
            TD(2,II)= 100.*AP(4)
```

```
            TD(3,II)= 100.*AP(5)
            TA(1,II)= 100.*AP(1)
C
C           ESTIMATE NEW INITIAL VALUES
            X(1)= X(1)*R/(R-DR)
C
     10     CONTINUE
            CALL PLOT(TD,3,50,100)
            CALL PLOT(TA,1,50,100)
            CALL PLOTM(TB,2,50,100)
            END
C           SOLUTION FOR LINEAR EQUATIONS
C           GAUSS ELIMINATION METHOD
C
C
            SUBROUTINE  LINQ(A,B,D,N,DET)
C           -----------------------------
C           DEFINITIONS
C             A = N*N COEFFICIENT MAT
C             B = N*1 MAT OF AX=B
C             C = N*N+1 WORKING MAT
C             D = SOLUTION MAT
C             N = NUMBER OF EQ'S
C             DET = DETERMINENT OF MAT A
C
            DIMENSION A(20,20),B(20),C(20,21),D(20)
C           INITIALIZE PARAMETERS
            N1=N+1
            N0=N-1
            EPS=1.E-10
            DET=1.
C           LOAD A AND B INTO C MAT
            DO 10 I=1,N
            C(I,N1)=B(I)
            DO 10 J=1,N
     10     C(I,J) = A(I,J)
C
C           TRIANGULARIZE SYSTEM OF EQ'S
C
            DO 110 IP=1,N
            IM=IP
            IST=IP+1
            IF (IST.LE.N) GO TO 20
C           LAST ROW CALCULATION
            IF (ABS(C(N,N)).LT.EPS) GO TO 40
            C(N,N1)=C(N,N1)/C(N,N)
            DET=C(N,N)*DET
            C(N,N)=1.
            GO TO 120
C           DETERMINE PIVOT ELEMENT AND UPDATE DETERMINENT
     20     DO 30 I=IST,N
            IF (ABS(C(IM,IP)).GE.ABS(C(I,IP))) GO TO 30
            IM=I
     30     CONTINUE
            IF (ABS(C(IM,IP)).GE.EPS) GO TO 70
C           ERROR OUTPUT SECTION
     40     WRITE(6,50) IP,C(IM,IP)
     50     FORMAT(1H ,///10X,23HPIVOT ELEMENT IN COLUMN,I3,2H =,1PE12.5)
            IF (C(IM,IP).EQ.0.) WRITE(6,60)
     60     FORMAT(1H0,9X,46HSOLUTION IMPOSSIBLE, DIAGONAL ELEMENT IS ZERO.
            IF (C(IM,IP).EQ.0.) STOP
     70     DET=C(IM,IP)*DET
C           TEST FOR DIAGONAL ELEMENT AND SWAP ROWS
            IF (IM.EQ.IP) GO TO 90
```

```
C       SWAP ROWS TO LOCATE PIVOT ELEMENT
        DET=-DET
        DO 80 J=IP,N1
        CL=C(IP,J)
        C(IP,J)=C(IM,J)
   80   C(IM,J)=CL
C       FIND MULTIPLICATION CONSTANT
   90   CL=C(IP,IP)
        C(IP,IP)=1.
C       DIVIDE ROW BY PIVOT ELEMENT
        DO 95 J=IST,N1
   95   C(IP,J)=C(IP,J)/CL
C       ZERO PIVOT COLUMN AND ADJUST MATRIX
        DO 100 I=IST,N1
        CL=C(I,IP)
        C(I,IP)=0.
        DO 100 J=IST,N1
  100   C(I,J)=C(I,J)-CL*C(IP,J)
  110   CONTINUE
C       DETERMINE SOLUTION BY BACK SUBSTITION
  120   DO 140 I=1,NO
        K=N-I
        SUM=0.
        DO 130 L=1,I
        J=N1-L
  130   SUM=SUM+C(K,J)*C(J,N1)
  140   C(K,N1)=C(K,N1)-SUM
C       LOAD D VECTOR = SOLUTION VECTOR X
        DO 150 I= 1,N
  150   D(I)=C(I,N1)
        RETURN
        END
C       FILENAME= " PRINT.FOR "

SUBROUTINE MINP(X,JMP,N)
C       ------------------------
        DIMENSION  A(20,20),X(20),X0(20),D(20),F(20),PAR(2)
        COMMON     /AAA/ X0,PAR,DM,E
        COMMON     /CHK/ A,D,F,NC,NB,ES
        COMMON     /IPR/ IP
C
        EPS = 1.E-10
        E   = 0.
        LD  = 0
        JMP = 0
C
C       ERROR CALCULATION
        DO 10 J=1,N
   10   E = E + F(J)**2
        IF(E.LT.ES) RETURN
C
C       STEP SIZE ADJUSTMENT
        SD = 0.
        DO 15 J=1,N
   15   SD = SD + D(J)**2
        DST= SQRT(SD)/DM
        XST= SQRT(DST+1.)
        IF(XST.GT.5.) XST=XST*SQRT(SQRT(XST-4.))
        DO 20 J=1,N
   20   D(J)= D(J)/XST
C       IMPROVED GUESSES FOR SOLUTION
        DO 25 J=1,N
        X0(J) = X(J)
   25   X(J)  = X(J)+D(J)
```

```
C
C         CHECK IF THE MINIMUM POINT IS WITHIN THE CALCULATED
C         STEP SIZE, IF SO, READJUST STEP SIZE.
          DO 50 I=1,50
          CALL FCN(X,F,N,PAR)          ! CAL [F(X)] AGAIN
          E2 = 0.                      ! CAL ERROR   AGAIN
          DO 30 J=1,N
   30     E2 = E2 + F(J)**2
C         CHECK ERROR DIFFERENCE
          JMP = 0
          IF(E2.LT.E) RETURN
          IF(ABS(E2-E)/E.GT.EPS) GO TO 40
          IF(LD.EQ.1) GO TO 60
          LD = 1
C         REDUCE STEP SIZE AND RECAL AGAIN
   40     DO 50 J=1,N
          D(J) = D(J)/2.
          X(J) = X0(J) + D(J)
   50     CONTINUE
C
          WRITE(6,200)
          GO TO 70
   60     IF(IP.EQ.1) WRITE(6,300)
   70     JMP = 1
  200     FORMAT(/' @ SEEMS TO BE MINPOINT, PLEASE CHECK!')
  300     FORMAT(///' ZZ  MINPOINT IS REACHED - NO ZERO SOL')
          RETURN
          END
          SUBROUTINE PR(X,E,PAR,N)
C         --------------------------
          DIMENSION X(20),XX(20),A(20,20),D(20),F(20),PAR(2)
          COMMON    /DAT/ PI,B(5)
          COMMON    /CHK/ A,D,F,NC,NB,ES
          COMMON    /SCALE/ KP,FSC(10),HS(5)
C
          R  = PAR(1)
          WRITE(6,100) R,E
          DO 50 J=1,N
   50     XX(J)=180.*X(J)/PI
          IF(NB.EQ.1) WRITE(6,105) R
C
          IF(NC.LE.0) GO TO 170
          WRITE(6,110)
          WRITE(6,150) (XX(J),J=1,3)
          IF(NB.EQ.1) RETURN
          WRITE(6,120)
          WRITE(6,150) (F(J),J=1,3)
          WRITE(6,130)
          WRITE(6,160) ((A(K,J),J=1,3),K=1,3)
          WRITE(6,140)
          WRITE(6,150) (D(J),J=1,3)
  105     FORMAT(' ERROR BOUND VIOLATION'/
         *  T10,'FOR R=',F5.2)
  110     FORMAT(/' X MAT')
  120     FORMAT(/' F MAT')
  130     FORMAT(/' A MAT')
  140     FORMAT(/' D MAT')
  150     FORMAT(/3(2X,G12.5))
  160     FORMAT( 3(/3(2X,G12.5)) )
  170     NC= NC-1
C
  100     FORMAT(/' ###  FOR R=',F5.2/
         *  ' SUM OF ERROR **2 =',E12.5)
          IF(E.LT.ES) WRITE(6,200)
```

```
          IF(E.GT.ES) WRITE(6,250)
          WRITE(6,300) (XX(I),I=1,3)
          IF(KP.EQ.1) WRITE(6,350) R,(FSC(J),J=1,4)
  200     FORMAT(////' * FINAL   SOLUTIONS')
  250     FORMAT(////' * VALUES FOR MINIMUM POINT')
  300     FORMAT(3(/T10,3HX =,F12.3,8H for I = ,I3) )
  350     FORMAT(//' ERRORS (NORMALIZED) FOR R=',F5.2//
         *    T5,'     1st           2nd           3rd           4th'
         *    /T5,4(1PE10.3,2X) //)
          RETURN
          END
          SUBROUTINE PLOT(Y,M,NF,NS)
C  ------------------------------------
          DIMENSION Y(M,NF),LINE(101),L(11),JL(10)
          DATA JL/1H1,1H2,1H3,1H4,1H5,1H6,1H7,1H8,1H9,1HA/
          DATA JN/1H-/
          DATA JP,JI,JBLANK,JZ/1H+,1HI,1H ,1H$/
C
          WRITE(6,10)
  10      FORMAT(1H1//)
C
          DO 99 I=1,101
          LINE(I)=JBLANK
  99      CONTINUE
          N=0
          M1=M
C*****    PRINT ORDINATE SCALE
          DO 101 I=1,11
          L(I)=10*I-110+NS
  101     CONTINUE
          WRITE(6,105) (L(I),I=1,11)
  105     FORMAT(10X,/3X,11(I4,6X))
          GO TO 115
  110     IF(N/10-(N-1)/10) 125,125,115
C*****    CONSTRUCT ORDINATE GRAPH LINE
  115     ND=0
          DO 120 I=1,10
          ND=ND+1
          LINE(ND)=JP
          DO 120 J=1,9
          ND=ND+1
  120     LINE(ND)=JN
          LINE(101)=JP
          IF(N) 135,121,135
  121     WRITE(6,170) N,LINE
          GO TO 185
C*****    CONSTRUCT 1 LINE OF ABSCISSA GRAPH LINES
  125     DO 130 I=1,101,10
          LINE(I)=JI
  130     CONTINUE
C*****    CHANGE NUMERICAL DATA TO LETTERS
  135     DO 160 I=1,M1
          XNS=NS
          JA=Y(I,N)+101.49999-XNS
          IF(JA-101)140,155,145
  140     IF(JA)150,150,155
  145     LINE(101)=JZ
          GO TO 160
  150     LINE(1)=JZ
          GO TO 160
  155     LINE(JA)=JL(I)
  160     CONTINUE
```

```
C*****   PRINT LINE OF DATA
         N1=2*N
         IF(N/10-(N-1)/10)175,175,165
  165    WRITE(6,170)N1,LINE
  170    FORMAT(1X,I4,101A1)
         GO TO 185
  175    WRITE(6,180)LINE
  180    FORMAT(5X,101A1)
C*****   SET LINE VARIABLES TO ZEROS
  185    DO 190 I=1,101
         LINE(I)=JBLANK
  190    CONTINUE
  195    N=N+1
         IF(N-NF)110,110,200
  200    RETURN
         END

SUBROUTINE PLOTM(Y,M,NF,NS)
C        ----------------------------------
         DIMENSION Y(M,NF),LINE(101),L(11),JL(10)
         DATA JL/1H1,1H2,1H3,1H4,1H5,1H6,1H7,1H8,1H9,1HA/
         DATA JN/1H-/
         DATA JP,JI,JBLANK,JZ/1H+,1HI,1H ,1H$/
C
         WRITE(6,10)
   10    FORMAT(1H1//)
C
         DO 99 I=1,101
         LINE(I)=JBLANK
   99    CONTINUE
         N=0
         M1=M
C*****   PRINT ORDINATE SCALE
         DO 101 I=1,11
         L(I)=5*I-55+NS/2
  101    CONTINUE
         WRITE(6,105) (L(I),I=1,11)
  105    FORMAT(10X,/3X,11(I4,6X),4HBETA,4X,4HDLTA)
         GO TO 115
  110    IF(N/10-(N-1)/10) 125,125,115
C*****   CONSTRUCT ORDINATE GRAPH LINE
  115    ND=0
         DO 120 I=1,10
         ND=ND+1
         LINE(ND)=JP
         DO 120 J=1,9
         ND=ND+1
  120    LINE(ND)=JN
         LINE(101)=JP
         IF(N) 135,121,135
  121    WRITE(6,170) N,LINE
         GO TO 185
C*****   CONSTRUCT 1 LINE OF ABSCISSA GRAPH LINES
  125    DO 130 I=1,101,10
         LINE(I)=JI
  130    CONTINUE
```

```
C*****   CHANGE NUMERICAL DATA TO LETTERS
   135   DO 160 I=1,M1
         XNS=NS
         JA=Y(I,N)+101.49999-XNS
         IF(JA-101)140,155,145
   140   IF(JA)150,150,155
   145   LINE(101)=JZ
         GO TO 160
   150   LINE(1)=JZ
         GO TO 160
   155   LINE(JA)=JL(I)
   160   CONTINUE
C*****   PRINT LINE OF DATA
         N1=2*N
         IF(N/10-(N-1)/10)175,175,165
   165   WRITE(6,170)N1,LINE,(Y(K,N)/2.,K=1,2)
   170   FORMAT(1X,I4,101A1,2X,2(3X,F6.2))
         GO TO 185
   175   WRITE(6,180)LINE,(Y(K,N)/2.,K=1,2)
   180   FORMAT(5X,101A1,2X,2(3X,F6.2))
C*****   SET LINE VARIABLES TO ZEROS
   185   DO 190 I=1,101
         LINE(I)=JBLANK
   190   CONTINUE
   195   N=N+1
         IF(N-NF)110,110,200
   200   RETURN
         END

SUBROUTINE DFCN(A,F,X,N)
         INTEGER    N
         DIMENSION  A(20,20),F(20),F0(20),X(20),X0(20),PAR(2)
         COMMON     /DFF/ DX,R
C
C        DERIVATIVE MAT dF/dX calculation
C
         PAR(1)= R
C
         DO 10 I=1,10
    10   F0(I)= F(I)
C
         DO 30 J=1,N
         X0(J)= X(J)
         DXL= DX
         DO 15 L=1,10
         X(J) = X0(J)+DXL
         CALL FCN(X,F,N,PAR)
         SF= 0.
         DO 12 I=1,N
    12   SF= SF + (F0(I) - F(I))**2
         IF(SF.GT.1.E-18) GO TO 18
         DXL= 2.*DXL
    15   CONTINUE
         TYPE *,' @ COLUMN OF A MAT IS TOO SMALL'
         STOP
    18   DO 20 I=1,N
    20   A(I,J)= (F0(I) - F(I))/DXL
         X(J) = X0(J)
    30   CONTINUE
C
         DO 40 I=1,N
    40   F(I)= F0(I)
         RETURN
         END
```

```
C      OBJECTIVE FUNCTIONS
C      NONLINEAR MULTIVARIABLE UFC PWM EXPRESSIONS
C      MAIN FUNC  AND DERIVATIVE FUNC  FOR DOUBLE PWM UFC
C
       SUBROUTINE FCN(X,F,N,PAR)
       INTEGER    N
       DIMENSION  X(20),F(20),Z(10),PAR(2),H6(21),HC(21),AF(20)
       COMMON     /DAT/ PI,H(5)
       COMMON     /DFF/ DX,R
       COMMON     /FLT/ WO,Q,AP(5)
       DATA       IFCN/ 0 /
C
C      CALCULATION OF COEFFICIENTS
       IF(IFCN.EQ.1) GO TO 15
       HC(1)= 1.
       DO 5 K=1,10
       K1= 2*K
       K2= 2*K + 1
       H6(K1)= 6*K
       H6(K2)= H6(K1)
       HC(K1)= H6(K1) - 1
       HC(K2)= H6(K2) + 1
    5  CONTINUE
C
C      LOWPASS FILTER FUNCTION
   15  DO 10 K=2,20
       WR= (HC(K) + H6(K)*R)/WO
       APN= 1.+ (WR/Q)**2
       APD= (1.- WR2)2 + (WR/Q)**2
       AF(K)= APN/APD
   10  CONTINUE
C
       DO 20 I=1,20
       Z(1)= SIN( HC(I)*X(1)/2.)
       Z(2)= Z(1)
       Z(3)= COS( HC(I)*X(2) )
       F(I)= -( Z(1)**2 + Z(2)**2 + 2.*Z(1)*Z(2)*Z(3) )/HC(I)**2
   20  CONTINUE
C
C      AUXILIARY STORAGES
       AP(4)= F(2)
       AP(5)= F(3)
       IFCN= 1
C
C      OBJECTIVE FUNCTIONS
       F(1)= (PAR(1)/2.)**2 + F(1)       ! 1ST
       F(2)= AF(2)*F(2) + AF(3)*F(3)     ! 5TH,7TH
C
       AP(1)= F(2)
       DO 30 K=4,20
       AP(1)= AP(1) + AF(K)*F(K)
   30  CONTINUE
C
       RETURN
       END
C      OBJECTIVE FUNCTIONS
C      NONLINEAR MULTIVARIABLE UFC PWM EXPRESSIONS
C      MAIN FUNC  AND DERIVATIVE FUNC  FOR TRIPLE PWM UFC
C
       SUBROUTINE FCN(X,F,N,PAR)
       INTEGER    N
       DIMENSION  X(20),F(20),Z(10),PAR(2),H6(21),HC(21),AF(20)
       COMMON     /DAT/ PI,H(5)
       COMMON     /DFF/ DX,R
```

USERNAME: CHO
FILENAME: FCNAF.FOR;5

```
              COMMON     /FLT/ W0,Q,AP(5)
              DATA       IFCN/ 0 /
C
C             CALCULATION OF COEFFICIENTS
              IF(IFCN.EQ.1) GO TO 15
              HC(1)= 1.
              DO 5 K=1,10
              K1= 2*K
              K2= 2*K + 1
              H6(K1)= 6*K
              H6(K2)= H6(K1)
              HC(K1)= H6(K1) - 1
              HC(K2)= H6(K2) + 1
       5      CONTINUE
C
       15     DO 10 I=1,20
              SB1 = SIN( HC(I)*X(1)/2.)
              CD1 = COS( HC(I)*X(2) )
              F(I)= -(SB1*(1.+ 2.*CD1)/HC(I))**2
       10     CONTINUE
C
C             LOWPASS FILTER FUNCTION
              DO 20 K=2,20
              WR= (HC(K) + H6(K)*R)/W0
              APN= 1.+ (WR/Q)**2
              APD= (1.- WR2)2 + (WR/Q)**2
              AF(K)= APN/APD
       20     CONTINUE
C
C             AUXILIARY STORAGES
              Z(1)= F(2)
              Z(2)= F(3)
C
C             OBJECTIVE FUNCTIONS
              F(1)= (PAR(1)/2.)**2 + F(1)        ! 1ST
              F(2)= AF(2)*F(2) + AF(3)*F(3) + AF(4)*F(4) + AF(5)*F(5)
C             ! 5,7,11,13
              AP(1)= F(2)
              DO 30 K=6,20
              AP(1)= AP(1) + AF(K)*F(K)
       30     CONTINUE
C
C             AUXILIARY STORAGES
              AP(4)= Z(1)
              AP(5)= Z(2)
              IFCN= 1
C
              RETURN
              END
C             OBJECTIVE FUNCTIONS
C             NONLINEAR MULTIVARIABLE UFC PWM EXPRESSIONS
C             MAIN FUNC  AND DERIVATIVE FUNC  FOR ▆▆▆▆ PWM UFC
C                                                  QUADRAPLE
              SUBROUTINE FCN(X,F,N,PAR)
              INTEGER    N
              DIMENSION  X(20),F(20),Z(10),PAR(2)
              COMMON     /DAT/ PI,H(5)
              COMMON     /DFF/ DX,R
              COMMON     /FLT/ W0,Q,AP(5)
C
              DO 10 I=1,5
              SB1 = SIN( H(I)*X(1)/2.)
              CD1 = COS( H(I)*X(2) )
              CD2 = COS( H(I)*X(3) )
```

USERNAME: CHO
FILENAME: FCNQF.FOR;2

USERNAME: CHO
FILENAME: FCNTF.FOR;

```
        F(I)= -(2.*SB1*(CD1 + CD2)/H(I))**2
10      CONTINUE
C
C       LOWPASS FILTER FUNCTION
        DO 20 K=2,5
        WR= (H(K)+6.*R)/WO
        APN= 1.+ (WR/Q)**2
        APD= (1.- WR2)2 + (WR/Q)**2
        AP(K)= APN/APD
20      CONTINUE
C
C       AUXILIARY STORAGES
        Z(1)= F(2)
        Z(2)= F(3)
C
C       OBJECTIVE FUNCTIONS
        F(1)= (PAR(1)/2.)**2 + F(1)           ! 1ST
        F(2)= AP(2)*F(2) + AP(3)*F(3)         ! 5TH,7TH
        F(3)= AP(4)*F(4) + AP(5)*F(5)         ! 11TH,13TH
C
C       AUXILIARY STORAGES
        AP(4)= Z(1)
        AP(5)= Z(2)
C
        RETURN
        END
```

We claim:

1. In a frequency conversion apparatus having a plurality of phase-related static converters each coupled between a polyphase AC power source of frequency $f_{IN}$ and a polyphase AC output power supply of frequency $f_O$, including:

for each of said converters a plurality of controllable bilateral switching units controlled for conduction in succession during a time period (TP) characterizing said frequency $f_O$, each switching unit having a controllable conduction time interval (t) within a common time frame T defined by a controllable repetition rate, and occurring through said succession at said repetition rate to derive energy from said AC power source through the associated converter during successive segments of voltage, on a phase basis, and to apply the derived voltage segments of said succession to said output so as to form with associated like pluralities of converter switching units an AC polyphase power supply therefore;

the frequency $f_O$ of said AC power supply being a function of the difference between the frequency $f_{IN}$ of said AC power source and said repetition rate; the combination of:

means synchronized with said repetition rate and operative on said controllable conduction time interval (t) for establishing with said succession of switching units n elementary conduction time intervals (t*) distributed throughout the time frame (T) of operation of each switching unit in said succession and occurring at a rate which is n times said repetition rate, n being an integer, the sum of said elementary conduction time intervals (t*) within such time frame (T) being equal to said controllable conduction time interval (t);

means for establishing selected phase positions for said n individual time intervals (t*) within said time frame (T) to distribute said n time intervals (t*) unequally through said time frame T so as to minimize at least one frequency component of the harmonics reflected back to said AC power source; and means for controlling the switching units of said succession independently and concurrently as a single-pulse-width modulated apparatus in relation to a desired frequency $f_O$ and a desired output voltage $V_O$.

2. The apparatus of claim 1 with said phase positions being selected to cancel out one selected frequency component.

3. The apparatus of claim 1 with a lowpass input filter being inserted between said AC power source and the input of the said apparatus, said phase positions being selected to minimize the frequency components below the cut-off response of said lowpass filter.

4. The apparatus of claim 3 with said filter being a low pass LC input filter.

5. The apparatus of claim 1 with said AC power source and said AC output being three-phase systems; the frequencies of the harmonic components being given by:

$$f_n \text{ input current} = 6_m f_O + (6m \pm 1)f_I$$

where m = 1, 2, ... etc.;

with n = 2, said two time intervals (t*) being a mirror image of one another within said time interval (T), a distance δ from one another axis to axis and having a width β, the distance δ being chosen so as to eliminate specific frequency components in the input current from said AC power source.

6. The apparatus of claim 5 with T = 60 electrical degrees, and δ/2 = 18°, thereby to eliminate $(6f_I + 5f_O)$ in the output voltage and $(5f_I + 6f_O)$ in the input current.

7. The apparatus of claim 5 with T = 60 electrical degrees, and δ/2 = 12.86°, thereby to eliminate $(5f_I + 7f_O)$ in the output voltage, and $(7f_I + 6f_O)$ in the input current.

8. The apparatus of claim 5 with T=60 electrical degrees, and $\delta/2=8.18°$, thereby to eliminate $(2f_I+1-1f_O)$ in the output voltage and $(11f_I+12f_O)$ in the input current.

9. The apparatus of claim 5 with T=60 electrical degrees, and $\delta/2=6.92°$, thereby to eliminate $(12f_I+1-3f_O)$ in the output voltage, and $(13f_I+12f_O)$ in the input current.

10. The apparatus of claim 1 with said AC power source and said AC output being three-phase systems; the frequencies of the harmonic components being given by $$f_n \text{ input current} = 6_m f_O + (6_m \pm 1) f_I$$

where m=1, 2, ... etc.;
with n=3, said three time intervals (f*) forming a mirror image of one another about the axis of a central one of them, within said time interval (T), a distance $2\delta$ between the axis of the outer ones of them, said time interval being $\beta$ wide; the distance $\delta$ being chosen so as to eliminate selected frequency components in the input current from said AC power source.

11. The apparatus of claim 10 with T=60°, $\delta/2=240$, thereby to eliminate $(6f_I+5f_O)$ in the output voltage and $(5f_I+6f_O)$ in the input current.

12. The apparatus of claim 10 with T=60°, $\delta/2=17.14°$, thereby to eliminate $(6f_I+7f_O)$ in the output voltage and $(7f_I+6f_O)$ in the input current.

13. The apparatus of claim 1 with said AC power source and said AC output being three-phase systems; the frequencies of the harmonic components being given by $$f_n \text{ input current} = 6_m f_O + (6_m \pm 1) f_{IN}$$

where m=1, 2, ... etc.;
with n=4, said four time intervals forming a mirror image about the middle ones of said time interval T with two inner time intervals (t*) at $2\delta_1$ from one another axis to axis, and two outer time intervals (t*) at $2\delta_2$ from one another axis-to-axis, said time interval (t*) being $\beta$ wide; the distance $\delta_1$ and $\delta_2$ being chosen so as to eliminate selected frequency components in the input current from said AC power source.

14. The apparatus of claim 13 with $\delta_1=9.25°$ and $\delta_2=26.60°$ thereby to eliminate $(6f_I+5f_O)$ in the output voltage and $(5f_I+6f_O)$ in the input current.

15. The apparatus of claim 13 with $\delta_1=4.34°$ and $\delta_2=21.91°$ thereby to eliminate $(6f_I+7f_O)$ in the output voltage and $(7f_I+6f_O)$ in the input current.

16. In a frequency conversion apparatus having a plurality of phase-related static converters each coupled between a polyphase AC power source of frequency $f_{IN}$ and a polyphase AC output power supply of frequency $f_O$, including:
for each of said converters a plurality of controllable bilateral switching units controlled for conduction in succession during a time period (TP) characterizing said frequency $f_O$, each switching unit having a controllable conduction time interval (t) within a common time frame T defined by a controllable repetition rate, and occurring through said succession at said repetition rate to derive energy from said AC power source through the associated converter during successive segments of voltage, on a phase basis, and to apply the derived voltage segments of said succession to said output so as to form with associated like pluralities of converter switching units an AC polyphase power supply therefore;
the frequency $f_O$ of said AC power supply being a function of the difference between the frequency $f_{IN}$ of said AC power source and said repetition rate; the combination of:
means synchronized with said repetition rate and operative on said controllable conduction time interval (t) for establishing with said succession of switching units n elementary conduction time intervals (t*) distributed throughout the time frame (T) of operation of each switching unit in said succession and occurring at a rate which is n times said repetition rate, the sum of said elementary conduction time intervals (t*) within such time frame (T) being equal to said controllable conduction time interval (t) n being an integer in relation to the output frequency of said AC power supply;
means for initiating each time interval (t*) in succession at respective selected delays beyond the initiation of corresponding fractional time intervals T/n, said delays being chosen within such fractional time interval T/n so as to eliminate a selected frequency component in the input current from said AC power source;
means for terminating each of said time intervals (t*) to establish a controlled duration thereof, so as to control the output voltage;
said time intervals (t*) being unequally spaced and of unequal duration while being symmetrically disposed about the middle axis of said time frame (T); and
means for controlling said repetition rate to control the output frequency.

17. The apparatus of claim 16 with ROM means for storing functions representing the front edge occurrence and the tail edge occurrence of said time intervals (t) counted from the initiation of the corresponding fractional time interval T/n and representing the duration of such time intervals (t) as a function of the desired output voltage;
means for generating a train of pulses in relation to $(f_O+f_I)$ and for generating with said pulses said fractional time intervals T/n to control said ROM means, and means for controlling the switching units of said succession each one n times before controlling another, in response to said ROM means.

* * * * *